(12) United States Patent
Hong et al.

(10) Patent No.: US 12,527,741 B2
(45) Date of Patent: Jan. 20, 2026

(54) MODULAR DENDRON MICELLES FOR TREATMENT OF PULMONARY DISEASES RELATED TO FIBROSIS AND VIRAL INFECTION INCLUDING COVID-19

(71) Applicant: Wisconsin Alumni Research Foundation, Madison, WI (US)

(72) Inventors: Seungpyo Hong, Madison, WI (US); Allan Brasier, Madison, WI (US); Weiping Tang, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 872 days.

(21) Appl. No.: 17/840,964

(22) Filed: Jun. 15, 2022

(65) Prior Publication Data

US 2023/0000771 A1    Jan. 5, 2023

Related U.S. Application Data

(60) Provisional application No. 63/211,837, filed on Jun. 17, 2021.

(51) Int. Cl.
| | |
|---|---|
| A61K 9/107 | (2006.01) |
| A61K 47/10 | (2017.01) |
| A61K 47/34 | (2017.01) |
| A61K 47/60 | (2017.01) |
| A61K 47/69 | (2017.01) |
| A61K 31/453 | (2006.01) |
| A61K 31/454 | (2006.01) |
| A61K 31/496 | (2006.01) |
| A61K 31/5513 | (2006.01) |
| C07D 249/04 | (2006.01) |

(52) U.S. Cl.
CPC ............ *A61K 9/1075* (2013.01); *A61K 47/10* (2013.01); *A61K 47/34* (2013.01); *A61K 47/60* (2017.08); *A61K 47/6907* (2017.08); *A61K 47/6935* (2017.08); *A61K 31/453* (2013.01); *A61K 31/454* (2013.01); *A61K 31/496* (2013.01); *A61K 31/5513* (2013.01); *C07D 249/04* (2013.01)

(58) Field of Classification Search
CPC ... A61K 47/60; A61K 31/365; C08G 63/6882
See application file for complete search history.

(56) References Cited

U.S. PATENT DOCUMENTS

| | | |
|---|---|---|
| 2014/0142102 A1 | 5/2014 | Fairfax et al. |
| 2014/0213575 A1 | 7/2014 | Schmees et al. |
| 2014/0296230 A1 | 10/2014 | Smethurst et al. |
| 2014/0349990 A1 | 11/2014 | Blank et al. |
| 2015/0133447 A1 | 5/2015 | Engelhardt |
| 2015/0150884 A1 | 6/2015 | Liu et al. |
| 2015/0203483 A1 | 7/2015 | Siegel et al. |
| 2015/0299201 A1 | 10/2015 | Schmees et al. |
| 2015/0376196 A1 | 12/2015 | Schmees et al. |
| 2016/0176867 A1 | 6/2016 | Schmees et al. |
| 2016/0243247 A1 | 8/2016 | Bradner et al. |
| 2016/0272635 A1 | 9/2016 | Schmees et al. |
| 2016/0331685 A1* | 11/2016 | Hong ................ C08G 63/912 |
| 2016/0368919 A1 | 12/2016 | Casimiro-Garcia et al. |
| 2016/0375032 A1 | 12/2016 | Riveiro et al. |
| 2017/0015673 A1 | 1/2017 | Wang et al. |
| 2017/0029804 A1 | 2/2017 | Nakamura et al. |
| 2017/0174702 A1 | 6/2017 | Oh et al. |
| 2017/0298047 A1 | 10/2017 | Atkinson et al. |
| 2017/0320866 A1 | 11/2017 | Jiang et al. |
| 2017/0333444 A1 | 11/2017 | Landau et al. |
| 2017/0349607 A1 | 12/2017 | Seitzberg et al. |
| 2017/0360756 A1 | 12/2017 | Brown et al. |
| 2017/0360760 A1 | 12/2017 | Kharenko et al. |
| 2017/0360765 A1 | 12/2017 | Jiang et al. |
| 2018/0133212 A1 | 5/2018 | Bates et al. |
| 2018/0296566 A1 | 10/2018 | Wang et al. |
| 2019/0008866 A1 | 1/2019 | Bogdan et al. |
| 2019/0055235 A1 | 2/2019 | Brown et al. |
| 2019/0084981 A1 | 3/2019 | Dai et al. |
| 2019/0216782 A1 | 7/2019 | Liu et al. |
| 2019/0240219 A1 | 8/2019 | Engelhardt et al. |
| 2019/0358237 A1 | 11/2019 | Quinn et al. |
| 2019/0359573 A1 | 11/2019 | Zhou et al. |
| 2020/0031802 A1 | 1/2020 | Xiong et al. |
| 2020/0039984 A1 | 2/2020 | Lee et al. |
| 2020/0048220 A1 | 2/2020 | Bogdan et al. |
| 2020/0071332 A1 | 3/2020 | Bennett et al. |
| 2020/0148703 A1 | 5/2020 | Boloor |
| 2020/0255450 A1 | 8/2020 | Fan et al. |
| 2020/0299292 A1 | 9/2020 | Bayrakdian et al. |
| 2020/0331926 A1 | 10/2020 | Vadivelu et al. |
| 2020/0369642 A1 | 11/2020 | Bair et al. |
| 2021/0046073 A1 | 2/2021 | Amans et al. |

(Continued)

OTHER PUBLICATIONS

Jeong et al Nanoparticle Conjugation Stabilizes and Multimerizes β-Hairpin Peptides To Effectively Target PD-1/PD-L1 β-Sheet-Rich Interfaces, J. Am. Chem. Soc. 2020, 142, 1832-1837, published on Jan. 2, 2020.*

(Continued)

*Primary Examiner* — Gregory Listvoyb
(74) *Attorney, Agent, or Firm* — Karen A. LeCuyer; DeWitt LLP

(57) ABSTRACT

A self-assembled therapeutic dendron-micelle includes a first amphiphilic dendron-coil, a second amphiphilic dendron-coil, and optionally a third amphiphilic dendron-coil, and an encapsulated BRD4 ligand or BRD4 proteolysis targeting chimera. The first and optional third amphiphilic dendron-coils have a therapeutic peptide conjugated thereto. Also included are pharmaceutical compositions containing the dendron-micelles, methods of making the dendron-micelles, and therapeutic methods including administering the dendron-micelles to a subject in need thereof.

16 Claims, 17 Drawing Sheets

Specification includes a Sequence Listing.

(56) References Cited

U.S. PATENT DOCUMENTS

2021/0047304 A1 2/2021 Cowart et al.
2021/0070756 A1 3/2021 Fidanze et al.

OTHER PUBLICATIONS

Zhang et al Peptide Dendrimer-Doxorubicin Conjugate-Based Nanoparticles as an Enzyme-Responsive Drug Delivery System for Cancer Therapy, Adv. Healthcare Mater. 2014, 3, 1299-1308, published on Oct. 2014.*
Hsu Effect of Dendritic Polymer Architecture on Biological Behaviors of Self-Assembled Nanocarriers, PhD thesis, University of Illinois at Chicago, 2017, published on Mar. 2017.*
Bernau, Ksenija et al. Selective Inhibition of Bromodomain-Containing Protein 4 Reduces Myofibroblast Transdifferentiation and Pulmonary Fibrosis, 2022, Front. Mol. Med. 2:842558, 1-13.
Liu, Zhiqing et al. Discovery, X-ray Crystallography, and Anti-inflammatory Activity of Bromodomain-containing Protein 4 (BRD4) BD1 Inhibitors Targeting a Distinct New Binding Site, J. Med. Chem. 2022, 65, 2388-2408.
Skibba, Melissa et al. An orally bioavailable BRD4 inhibitor disrupts expansion of a pathogenic epithelial mesenchymal niche in bleomycin-induced fibrosis, Respiratory Research, 2025, 26:221, 1-21.
Lu, J. et al.; "Hijacking the E3 Ubiquitin Ligase Celebron to Efficiently Target BRD4," Chemistry & Biology, vol. 22, Issue No. 6; 2015; pp. 755-763.

* cited by examiner

MODULAR DENDRON MICELLES FOR TREATMENT OF PULMONARY DISEASES RELATED TO FIBROSIS AND VIRAL INFECTION INCLUDING COVID-19

CROSS-REFERENCE TO RELATED APPLICATIONS

This application claims priority to U.S. Provisional Application 63/211,837 filed on Jun. 17, 2021, which is incorporated herein by reference in its entirety.

STATEMENT REGARDING FEDERALLY SPONSORED RESEARCH & DEVELOPMENT

This invention was made with government support under A1062885 awarded by the National Institutes of Health. The government has certain rights in the invention.

SEQUENCE LISTING

The Instant Application contains a Sequence Listing which has been submitted electronically in ASCII format and is hereby incorporated by reference in its entirety. Said ASCII copy, created on May 10, 2022, is named "WIS0060US2 ST25" and is 6,714 bytes in size.

FIELD OF THE DISCLOSURE

The present disclosure is related to a drug delivery system for treatment of pulmonary diseases related to fibrosis and viral infection including COVID-19.

BACKGROUND

Interstitial lung disease (ILD) is a spectrum of lethal diseases associated with pulmonary fibrosis. ILD is associated with ageing, smoking, environmental exposures, such as burn pit exposures in combat zones and in response to infections caused by Severe Acute Respiratory Syndrome (SARS)-coronavirus 2 (CoV2). Currently, the most common form of ILD is idiopathic pulmonary fibrosis (IPF), although this may be changing due to the high numbers of patients with severe CoV2 respiratory infections. In the past, conventional medications for IPF included glucocorticosteroids (i.e., prednisone), antioxidants or immunosuppressants. However, combinations of these therapies resulted in increased mortality.

In 2014, oral nintedanib was a breakthrough therapy approved by the FDA. Nintedanib is a broad-spectrum small molecule inhibitor of receptor tyrosine kinases that reduces fibroblast proliferation and activation. Nintedanib has been subjected to clinical testing by randomized controlled trials, where efficacy was shown in slowing the decrease in forced vital capacity (FVC) in IPF and other progressive fibrosing interstitial lung diseases.

Pirfenidone was also licensed in 2014 by the FDA. Pirfenidone is a small molecule with antifibrotic, anti-inflammatory and antioxidant effects that inhibits TGFβ-stimulated collagen production. Several prospective studies have found that pirfenidone also slows the loss of FVC in IPF and improves progression-free survival.

Although these medications represent a substantial advance, they neither reverse established fibrosis nor are curative. What is needed are novel methods and combinations for treatment of pulmonary diseases related to fibrosis and viral infection including COVID-19.

BRIEF SUMMARY

In an aspect, a self-assembled therapeutic dendron-micelle comprises a first amphiphilic dendron-coil, and a second amphiphilic dendron-coil; and an encapsulated BRD4 inhibitor; wherein the first amphiphilic dendron-coil comprises a first non-peptidyl, hydrophobic core-forming component covalently linked to a first polyester dendron which is covalently linked to first a poly(ethylene glycol) (PEG) moiety, wherein the first PEG moiety comprises a first conjugated therapeutic peptide; and wherein the second amphiphilic dendron-coil comprises a second non-peptidyl, hydrophobic core-forming component covalently linked to a second polyester dendron which is covalently linked to a third poly(ethylene glycol) (PEG) moiety, wherein the second PEG moiety does not comprise a conjugated peptide.

In another aspect, a pharmaceutical composition comprises the self-assembled therapeutic dendron-micelle described above.

Also included are methods of treating pulmonary fibrosis, comprising administering by inhalation a therapeutically effective amount of the self-assembled therapeutic dendron-micelle described above.

Figure 1A:
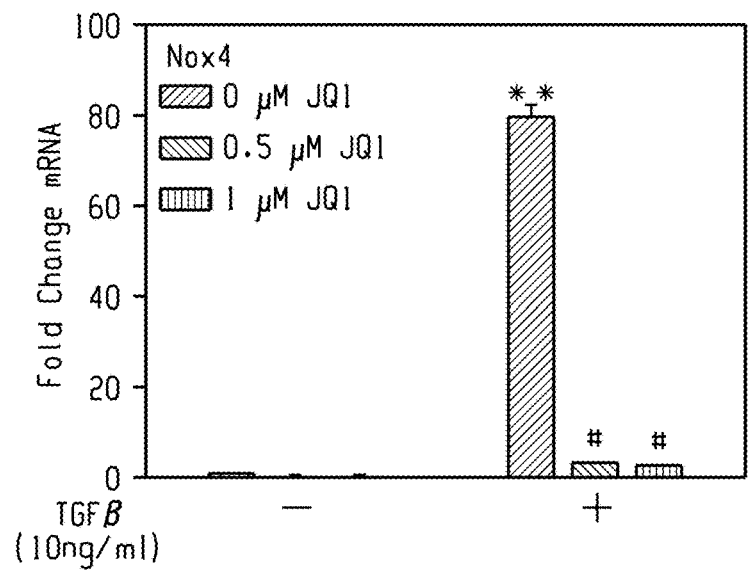
FIGS. 1. A-F show that BRD4 is required for TGFβ-induced myofibroblast transition. 1A, Q-RT-PCR of NOX4 expression in response to TGFβ in the ± of BRD4 inhibitor. 1B, 1C, Q-RT-PCR of SM22α and FN, respectively. 1D, Effect of JQ1 on TGFβ-induced contractility. Shown is collagen contraction assay (top) with quantification at bottom. 1E, Western blot of siRNA knockdown of BRD4 isoforms. 1F, Effect of BRD4 silencing on NOX4 expression. **, $p<0.01$, #, $p<0.01$ compared to TGFβ treatment with vehicle.
Figure 1B:
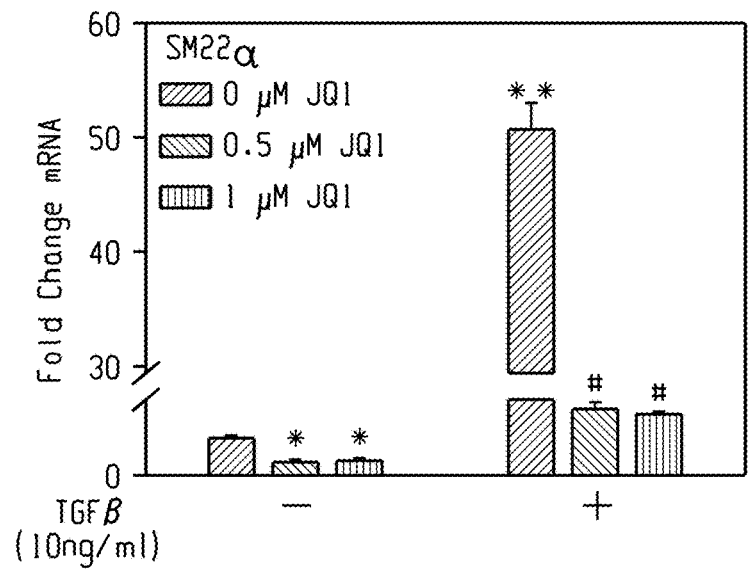
Figure 1C:
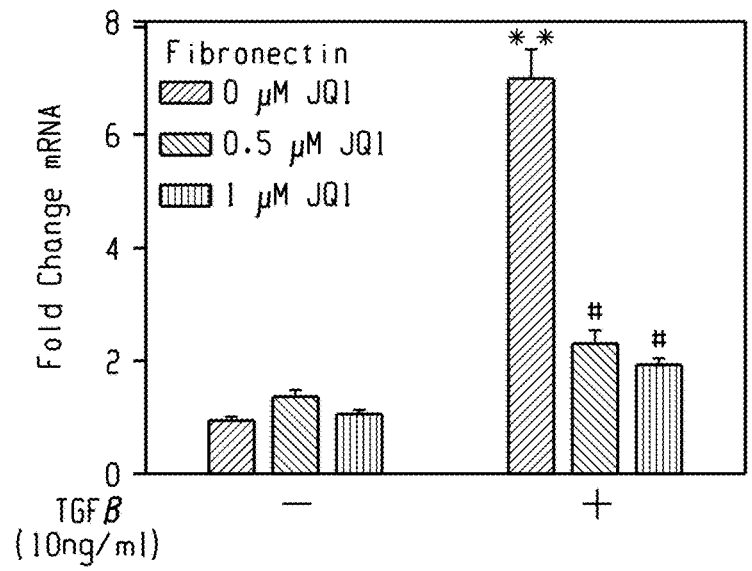
Figure 1D:
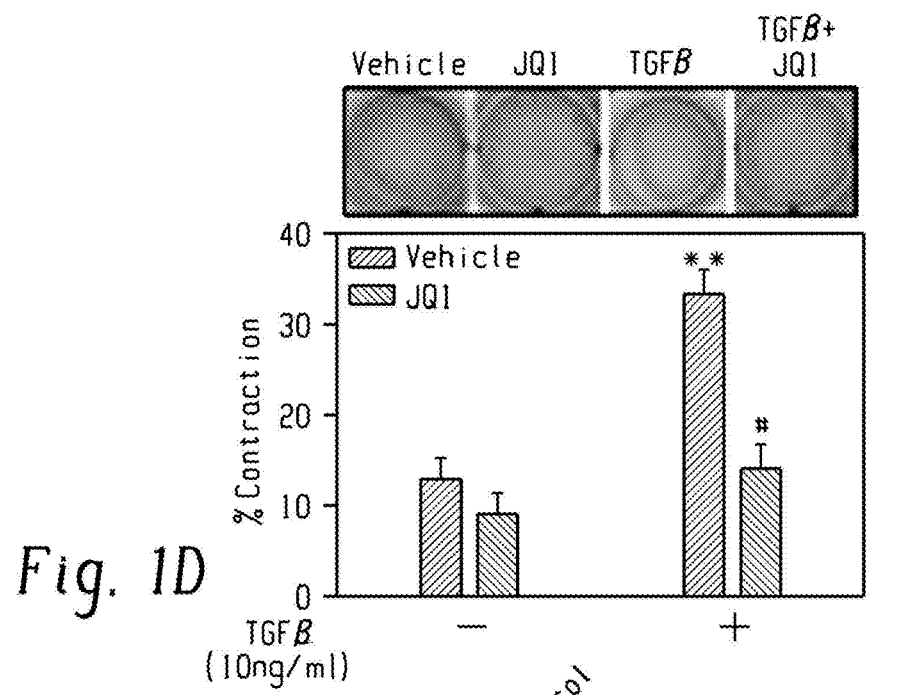
Figure 1E:
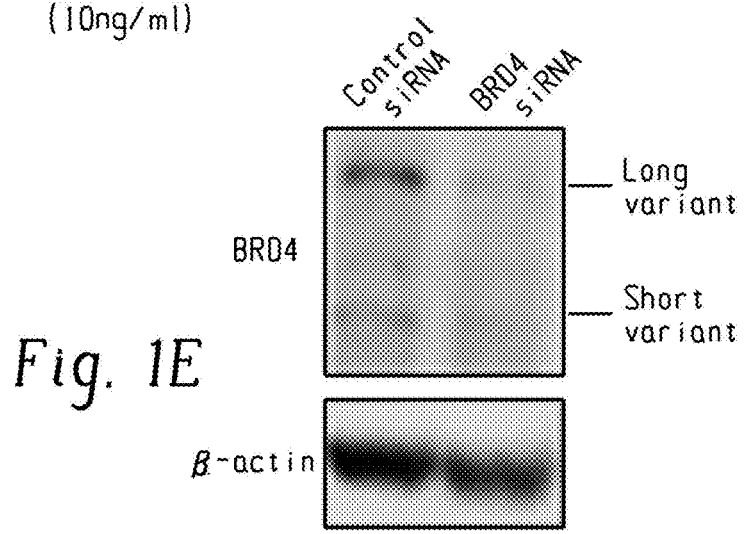
Figure 1F:
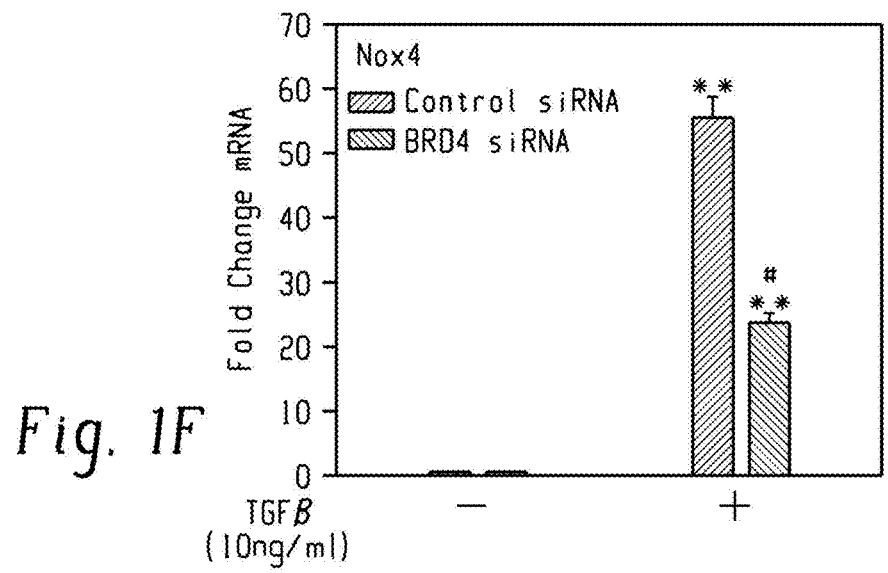

The above-described and other features will be appreciated and understood by those skilled in the art from the following detailed description, drawings, and appended claims.

DETAILED DESCRIPTION

Described herein is a modular dendron micelle (DM) platform for combination therapy for the treatment of pulmonary diseases such as fibrosis and COVID-19. The DM platform allows a mix-and-match approach where multiple functional/therapeutic agents can be easily integrated. Specifically, the DMs deliver a therapeutic peptide (e.g., a peptide which binds a cell-expressed immune checkpoint receptor such as a PD-L1-binding peptide, a fibronectin-binding peptide, a PDGFRb peptide, or a combination thereof) and a BRD4 inhibitor (BRD4i). The DMs provide an inhalable delivery solution for various pulmonary diseases.

As established herein, BRD4 is a major factor in the initiation and maintenance of myofibroblast phenotype; BRD4i administered in a therapeutic dosing regimen partially reverses bleomycin-induced pulmonary collagen deposition (to be improved by enhanced delivery using PDCs and their self-assembly into DMs); selectivity of aPD-L1 and aEGFR-conjugates are enhanced in vitro and in vivo; and, PD-L1 and/or FN1 binding peptides have significantly enhanced binding kinetics through multivalent binding effect.

Applying these results, an aerosolized cell-targeted nanoparticle to deliver BRD4i to a pathological myofibroblast populations, identified by selective receptors to reverse pulmonary fibrosis in ILDs is described. These receptors include PD-L1/ CD274, Fibronectin, and platelet derived growth factor (PDGFRβ). PD-L1+myofibroblasts are markers of cell types responsible for ECM production and obliteration of alveolar spaces in IPF. Fibronectin is associated with the fibroblastic foci, collections of pathological fibroblasts in IPF. Similarly, PDGF4b is also expressed by profibrotic pericyttes in IPF. We hypothesize that BRD4i encapsulated in multivalent DMs will selectively target and reduce the population of pathogenic myofibroblasts, ameliorating fibrosis and improving outcomes. We further hypothesize that DMs will maximizing delivery of therapeutic drug concentrations to areas of disease, enhance therapeutic effect over that seen using systemic delivery and minimizing undesirable systemic effects.

Specifically, described herein is the facile integration of the multiple agents through DMs that can be modularly multifunctionalized via a mix-and-match approach. The proposed DM system will be prepared through self-assembly of PEGylated dendron copolymers (e.g., PEG-polyester dendron poly-e-caprolactone, or PDCs). The PEGylated dendron copolymers are conjugated with therapeutic peptides such as: i) PD-1 mimicking peptides (pPD-1) and/or ii) a fibronectin binding peptide, along with a BRD4i encapsulated in the hydrophobic core.

First, the pre-organized conical structure imposed by a dendron enables self-assembly with an excellent thermodynamic stability, due to the minimal (pre-paid) entropy cost. Second, the hyperbranched structure of dendrons facilitates the multivalent binding effect that dramatically improves binding kinetics of targeting ligands (e.g., peptides to the level of (or higher than) the binding strength of corresponding antibodies). Third, the high-density poly(ethylene glycol) (PEG) outer layer provides maximal stealth effect for longer plasma circulation as well as modular control over PEG configuration effects on cell interactions. Lastly, the biodegradable, biocompatible polymer components (the core-forming poly-e-caprolactone (PCL) and polyester dendron) allow the controlled release of the drug molecules encapsulated in the core of DMs and mitigate the toxicity concerns. These characteristics of DMs will directly affect the functionality of the molecules integrated within the micelles. The thermodynamic stability will improve the structural integrity of DMs during circulation upon injection. The multivalent binding will maximize the binding kinetics of PD-L1 and fibronectin binding peptides, which will substantially increase the targeting efficacy and inhibition of binding between PD-1 and PD-L1, for example. The controlled biodegradation will allow the BDR4 inhibitor to be slowly released over a long period of time.

Advantageously, by incorporating the therapeutic peptides in the self-assembled dendron micelles, the spatial distance among different peptides can be maintained, which will facilitate the binding to different targets on cells, maximizing their biological effects (e.g., therapeutic efficacy or specificity towards diseased cells).

Described herein are self-assembled dendron micelles comprising two or more chemically distinct amphiphilic dendron-coils (DCs). Each amphiphilic dendron-coil comprises a non-peptidyl, hydrophobic core-forming component which is covalently linked to a polyester dendron which is covalently linked to a poly(ethylene glycol) (PEG) moiety. The hydrophobic core-forming component of the dendron-coils is non-peptidyl, that is, the hydrophobic core-forming block is not a peptide. In an aspect, the PEG moiety of the DC is conjugated to a therapeutic peptide, such as a β-hairpin peptide. Thus, in an aspect, each of the chemically distinct DCs of the self-assembled dendron micelles comprises a different conjugated therapeutic peptide, such as a β-hairpin peptide.

In an aspect, a self-assembled therapeutic dendron-micelle comprises a first amphiphilic dendron-coil, a second amphiphilic dendron-coil, and an encapsulated BRD4 inhibitor; wherein the first amphiphilic dendron-coil comprises a first non-peptidyl, hydrophobic core-forming component covalently linked to a first polyester dendron which is covalently linked to first a poly(ethylene glycol) (PEG) moiety, wherein the first PEG moiety comprises a conjugated first therapeutic peptide; and wherein the second amphiphilic dendron-coil comprises a second non-peptidyl, hydrophobic core-forming component covalently linked to a second polyester dendron which is covalently linked to a third poly(ethylene glycol) (PEG) moiety, wherein the second PEG moiety does not comprise a conjugated peptide.

In an aspect, the second amphiphilic dendron-coil can comprise a drug, ligand, or label as described herein.

In an aspect, the DMs comprise a third amphiphilic dendron coil, wherein the third amphiphilic dendron-coil comprises a third non-peptidyl, hydrophobic core-forming component covalently linked to a third polyester dendron which is covalently linked to a third poly(ethylene glycol) (PEG) moiety, wherein the third PEG moiety comprises a second therapeutic peptide, wherein the first and second therapeutic peptide are different.

In an aspect, the first and optional third amphiphilic dendron-coils comprising therapeutic peptides comprise 5 to 80 wt % of the self-assembled therapeutic dendron-micelle, while the second amphiphilic dendron-coil comprises 20 to 95 wt % of the self-assembled therapeutic dendron-micelle. The second amphiphilic dendron-coil with no conjugated peptide provides the basal structure of the micelle and provides spacing between the therapeutic peptides which can improve the efficacy of the micelles.

In an aspect, the self-assembled therapeutic dendron-micelle further comprises a fourth amphiphilic dendron-coil comprising a fourth non-peptidyl, hydrophobic core-forming component covalently linked to a fourth polyester dendron which is covalently linked to a fourth poly(ethylene glycol) (PEG) moiety, wherein the fourth PEG moiety comprises an imaging contrast agent, or therapeutic drug.

Exemplary non-peptidyl, hydrophobic core-forming components of the DCs comprise polycaprolactone (PCL), poly(lactic acid) (PLA), poly(glycolic acid) (PGA), poly(lactic-co-glycolic acid) (PLGA), or a combination thereof. In an aspect, the non-peptidyl, hydrophobic core-forming component is PCL, such as poly(ε-caprolactone). In an aspect, the non-peptidyl, hydrophobic core-forming component has a molecular weight of about 0.5 kDa to about 20 kDa. In specific aspects, the non-peptidyl, hydrophobic ore-forming component is poly(ε-caprolactone) with a molecular weight of about 3.5 kDa or poly(c-caprolactone) with a molecular weight of 14 kDa.

Exemplary polyester dendrons of the amphiphilic dendron-coil include, but are not limited to, a generation 3 to generation 5 [that is, a generation 3 (G3), a generation 4 (G4) or a generation 5 (G5)] polyester dendron with either an acetylene or carboxylate core. In a specific aspect, the polyester dendron is generation 3 polyester-8-hydroxyl-1-acetylene bis-MPA dendron. Methods of preparing and characterizing dendrons are well known in the art, and various polyester dendrons may be purchased from commercial entities.

Exemplary PEG moieties of the amphiphilic dendron-coil include a methoxy PEG (mPEG) moiety, amine-terminated PEG (PEG-NH$_2$) moiety, acetylated PEG (PEG-Ac) moiety, carboxylated PEG (PEG-COOH) moiety, thiol-terminated PEG (PEG-SH) moiety, N-hydroxysuccinimide-activated PEG (PEG-NHS) moiety, NH$_2$-PEG-NH$_2$ moiety, and an NH$_2$-PEG-COOH moiety. In aspects, the PEG moiety has a molecular weight including, but not limited to, a molecular weight of about 0.2 kDa to about 5 kDa. In some embodiments, the PEG moiety is an mPEG moiety with a molecular weight of about 2 kDa. In specific aspects, the PEG moiety is an mPEG moiety with a molecular weight of about 5 kDa.

In an aspect, the therapeutic peptide, e.g., the first conjugated therapeutic peptide, comprises a peptide with high affinity for an immune checkpoint receptor such as PD-L1, PD-1, OX40, TIGIT, CTLA-4, CD137 (4-1BB), CD28, and CD27.

Immune checkpoint inhibitor β-hairpin peptides can be identified by identifying immune checkpoint inhibitor ligand peptides, e.g., surface peptides that interact with high affinity with the immune checkpoint receptor surface. For example, surface β-hairpin PD-1 peptides which interact with PD-L1 with high affinity have been identified herein. As used herein, high affinity means $K_D$ of 0.1-1,000 nM. Such peptides can have lengths of 5 to 50 amino acids, and do not correspond to the entire immune checkpoint inhibitor.

Exemplary β-hairpin PD-1 peptides include:

SEQ ID NO: 1:
TYLCGAISLAPKLQIKESLRA ($βH_1$-wt sequence)

SEQ ID NO: 2:
TYVCGVISLAPRIQIKESLRA ($βH_1$-mutant sequence)

SEQ ID NO: 3:
VLNWYRMSPSNQTDRKAA ($βH_2$-wt sequence)

SEQ ID NO: 4:
HVVWHRESPSGQTDTKAA ($βH_2$-wt sequence)

In an aspect, the therapeutic peptide, e.g., the second therapeutic peptide, comprises a fibronectin-binding peptide. FN1-binding peptides include FBP I: TLQPVYEYMVGV (SEQ ID NO: 7) and FBP II: TGLPVGVGYVVTVLT (SEQ ID NO: 8).

Another type of therapeutic peptide is a peptide inhibitor based on the protease domain of angiotensin-converting enzyme 2 (ACE2), which binds to the SARS-CoV-2 receptor binding domains, for example.

SEQ ID NO: 10
EEQA KTFLD KFNHE AEDLF YQSSL ASWNY NTNIT (residue 21 to 55)

SEQ ID NO: 11
I EEQA KTFLD KFNHE AEDLF YQSSL ASWNY NTNIT
EENVQ NMNNA GDKWS AFLKE QSTLA QMYPL QEI
(residues 21 to 88)

SEQ ID NO: 12
WD LGKGD FR (residues 349 to 357)

SEQ ID NO: 13
I EEQA KTFLD KFNHE AEDLF YQSSL ASWNY NTNIT
EENVQ NMNNA GDKWS AFLKE QSTLA QMYPL QEIQA LTVKL
QLQAL QQNGS (residues 21 to 105)

```
                                                     SEQ ID NO: 14
MTQ GF WEN SMLTD PGNVQ KAVCH PTAWD LGKGD

FRILM CT (residues 323 to 362)

SEQ ID NO: 15
I EEQA KTFLD KFNHE AEDLF YQSSL ASWNY NTNIT

EENVQ NMNNA GDKWS AFLKE QSTLA QMYPL QEIQA LTVKL (residues 21 to 95)

SEQ ID NO: 16
D PGNVQ KAVCH PTAWD LGKGD FRILM CTKVT MDDFL

TAHHE MGHIQ YDMAY AAQPF LLRNG ANEGF (residues 335 to 400)
```

In another aspect, the therapeutic peptide is a PDGFR-beta-binding peptide. An example of a PDGFRβ-binding peptide is a 13 amino acid peptide targeting platelet-derived growth factor receptor beta (PDGFRβ) with the following sequence: IPLPPPSRPFFKY (SEQ ID NO: 17). Peptide binding can be measured against the recombinant extracellular domain of PDGFRβ using similar methods by SPR, BLI, and/or AFM. Cell lines that can be used for in vitro binding and internalization include BxPC3 and MCF7 cell lines, along with many ESFT cell lines expressing PDGFRβ, but not alpha, including TC-32, TC-71, MHH-ES-1, A4573, 6647, RD-ES, SK-ES and ES-295.

In an aspect, the micelles encapsulate or, in other words, are loaded with one or more drugs. A "drug" is a compound that, upon administration to a patient (including, but not limited to, a human or other animal) in a therapeutically effective amount, provides a therapeutic benefit to the patient.

The drug may include a discrete BRD4 ligand, a BRD4 ligand incorporated into a BRD4 proteolysis targeting chimera having the structure BRD4 ligand-linker-ubiquitin ligase cereblon ligand, or pharmaceutically acceptable salts thereof. BRD4 belongs to the BD and extraterminal (BET) family consisting of four members (BRD2, BRD3, BRD4, and BRDT). Similar to other subfamilies of BD-containing proteins, BET members function in epigenetic regulation of gene expression through binding to the KAc recognition pocket on histone tails and nonhistone proteins. Lysine acetylation (KAc) is one of the most broadly studied post-translational modifications occurring on histone proteins. This highly dynamic process is regulated by opposing actions of histone acetyl transferases (HATs) and histone deacetylases (HDACs). Histone acetylation also provides binding sites for proteins, especially BD-containing proteins, to promote chromatin reorganization and transcription. BET family proteins, especially BRD4, have emerged as a promising epigenetic target for human diseases and conditions.

The BRD4 ligand may be any BRD4 ligand known in the art. There are several classes of BRD4 ligands including azepines, triazobenzenes, fused tetracycles, quinolines, quinazolines, N-methylpyridinones, N-methylpyridazinones, triazolopyrazines, triazolopyridazines, triazolopyridines, triazoles, pyrroles, and isoxazoles. The BRD4 ligands disclosed in the following U.S. Patent Publications are herein incorporated by reference: US2016375032A1, US2015203483A1, US2015299201A1, US2015376196A1, US2014213575A1, US2021046073A1, US2017333444A1, US2020331926A1, US2016368919A1, US2016176867A1, US2016272635A1, US2017174702A1, US2020369642A1, US2020255450A1, US2021070756A1, US2015150884A1, US2020031802A1, US2017298047A1, US2014296230A1, US2019359573A1, US2018296566A1, US2019084981A1, US2017015673A1, US2019008866A1, US2017349607A1, US20140142102A1, US20170298040A1, US2019240219A1, US2020148703A1, US2020071332A1, US2020039984A1, US2018133212A1, US2019358237A1, US2019216782A1, US2019216782A1, US2015133447A1, US20140349990A1, US2020299292A1, US2017320866A1, US2017360765A1, US2017360756A1, US2017360760A1, US2019055235A1, US2020048220A1, and US2021047304A1.

The BRD4 ligand may have one of the following structures. When incorporated into a BRD4 proteolysis targeting chimera, the BRD4 ligand may be covalently attached to the linker by any member of the ring system or by a substituent.

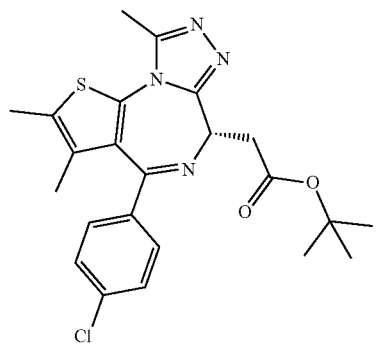

1(JQ1)

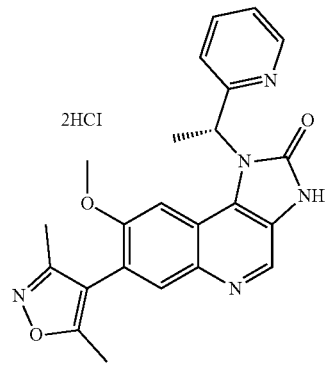

2(I-BET151)

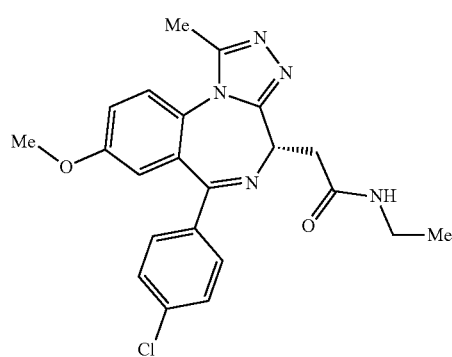

3(I-BET762)

4(TEN-010/R0680810)

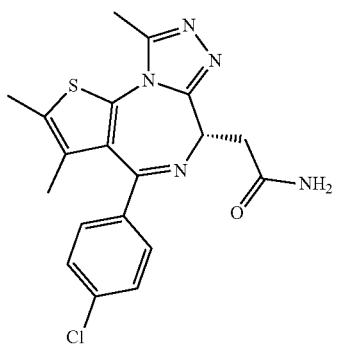

8(CPI-0610)

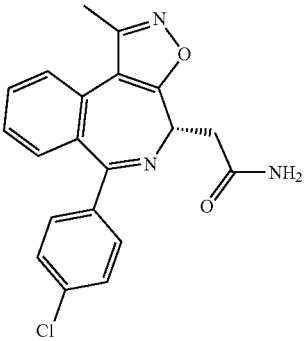

5(OTX015, MK8658)

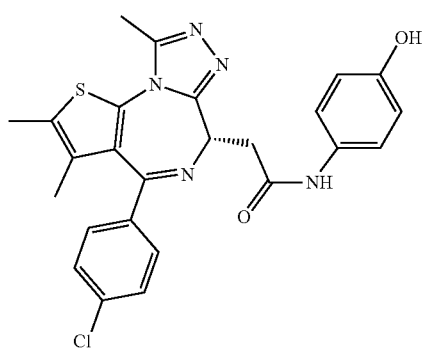

9(AZD5153)

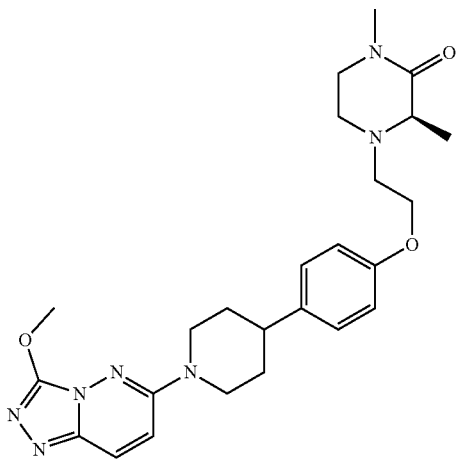

6(ABBV-075)

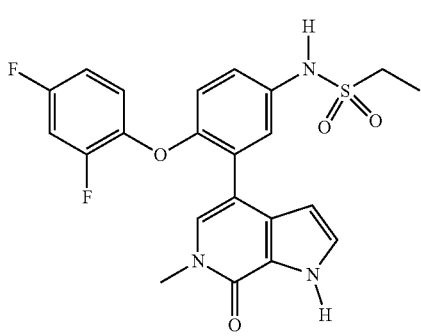

The BRD4 ligand may be one of Formulas (IA), (IB), (IC), (ID), (IE), (IF) or pharmaceutically acceptable salts thereof. When incorporated into a BRD4 proteolysis targeting chimera, the BRD4 ligand may be covalently attached to the linker by any member of the ring system or by a substituent.

BRD4 ligands of Formula (IA) have the following structure:

Formula (IA)

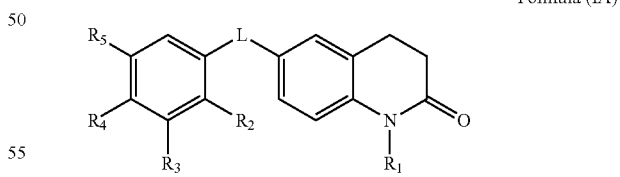

7(RVX-208)

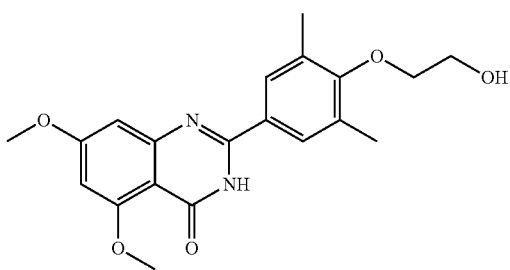

wherein L is —N=N— or —NH(CO)NH—; $R_1$ is H or $C_1$-$C_4$ alkyl or arylalkyl; $R_2$, $R_3$, and $R_5$ are independently H, —OH, alkyl, alkoxy, halogen, —$NH_2$, or —$CF_3$; $R_4$ is —OH, —$NH_2$, —$CF_3$, —$(CH_2)_n R_6$ where n is 1-4 and $R_6$ is —OH or —$NH_2$, $O(CH_2)_m R_7$ where m is 1-4 and $R_7$ is —OH or —$NH_2$, or $R_4$ and $R_5$ are optionally joined to form a 5-6 membered heteroaryl having 1-3 heteroatoms.

BRD4 ligands for Formula (TB) have the following structure:

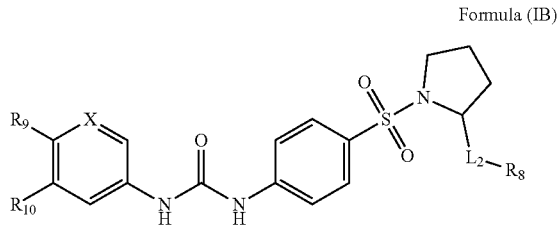

Formula (IB)

wherein $L_2$ is —$CH_2$— or —(CO)NH—; $R_2$ is H, —OH, alkyl, alkoxy, halogen, —$NH_2$, or —$CF_3$; $R_8$ is —OH, —OTs, alkoxy, ester, substituted or unsubstituted aryl, or substituted or unsubstituted 3-7 member heterocycle, or —$NR_{18}R_{19}$ where $R_{18}$ and $R_{19}$ are independently H, alkyl; or $R_{18}$ and $R_{19}$ are optionally joined to form a 3-6 membered substituted or unsubstituted heterocycle having 1-3 heteroatoms; X is C or N, wherein X can be at ring position 2, 3, 4, 5, or 6; $R^9$ and $R^{10}$ are independently from H, —OH, halogen, —$CF_3$, alkyl, hydroxylalkyl, amino, or alkylamino, or $R^9$ and $R^{10}$ are optionally joined to form a 5-6 membered heteroaryl or heterocycle having 1-3 heteroatoms and optionally substituted with one or more substituents from alkyl, acetyl, and carbonyl.

BRD4 ligands of Formula (IC) have the following structure:

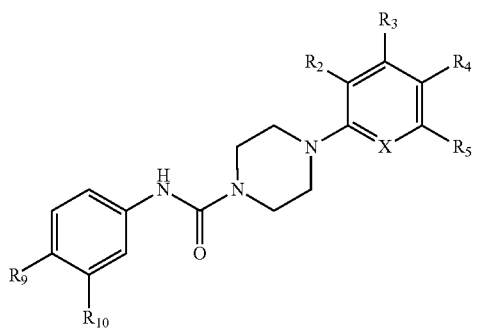

Formula (IC)

wherein $R^2$, $R^3$, and $R^5$ are independently H, —OH, alkyl, alkoxy, halogen, —$NH_2$, or —$CF_3$; $R^4$ is —OH, —$NH_2$, —$CF_3$, —$(CH_2)_nR^6$ where n is 1-4 and $R^6$ is —OH or —$NH_2$, —$O(CH_2)_mR^7$ where m is 1-4 and $R^7$ is —OH or —$NH_2$, or $R^4$ and $R^5$ are optionally joined to form a 5-6 membered heteroaryl having 1-3 heteroatoms; X is C, N, or O, wherein X can be at ring position 2, 3, 4, 5, or 6; $R^9$ and $R^{10}$ are each independently H, —OH, halogen, —$CF_3$, alkyl, hydroxylalkyl, amino, or alkylamino; or $R^9$ and $R^{10}$ are optionally joined to form a 5-6 membered heteroaryl or heterocycle having 1-3 heteroatoms and optionally substituted with one or more substituents from alkyl, acetyl, and carbonyl.

BRD4 ligands of Formula (ID) have the following structure:

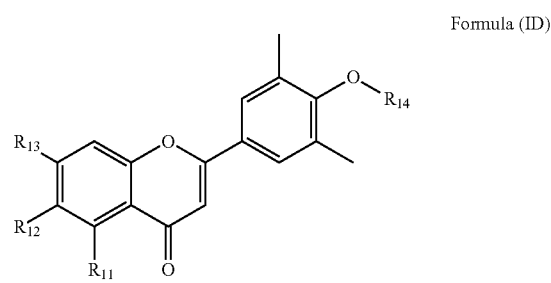

Formula (ID)

wherein $R_{11}$, $R_{12}$, and $R_{13}$ are independently H, —OH, halogen, alkoxy, —$NH_2$, —$CF_3$, —$(CO)R_{17}$ where $R_{17}$ is alkyl, alkoxy, amino, or alkylamino; $R_{14}$ is a $C_1$-$C_4$ alkyl substituted with one or more of: OH, halogen, alkoxy, amino, alkylamino, or an unsubstituted 5-6 membered heterocycle with 1-3 heteroatoms.

Non-limiting examples of ligands of Formula (1D) include 1D-1 to 1D-3.

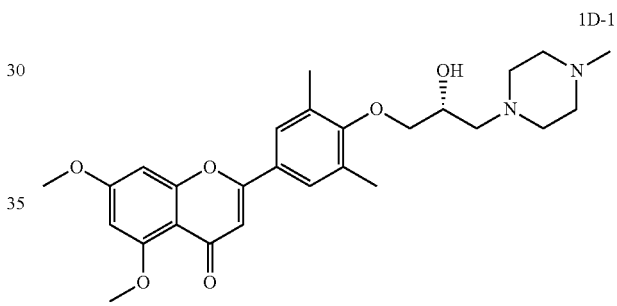

1D-1

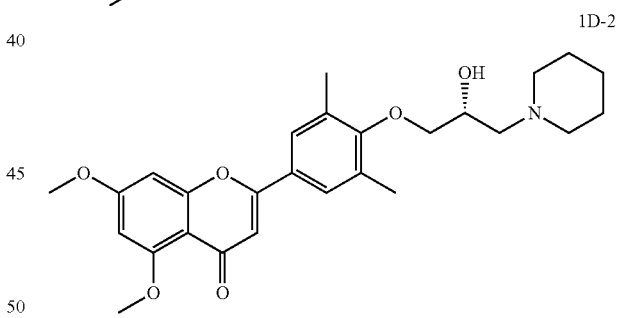

1D-2

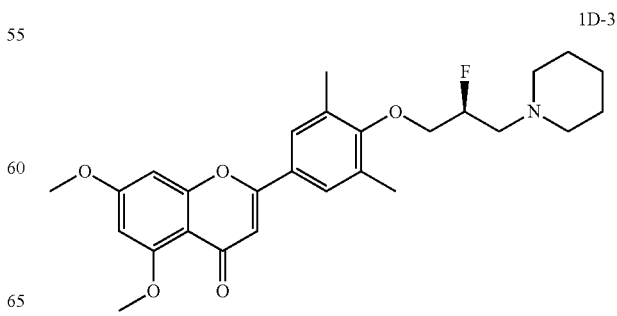

1D-3

BRD4 ligands of Formula (IE) have the following structure

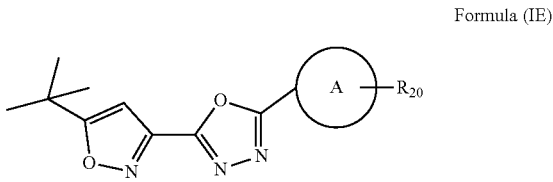

Formula (IE)

wherein A is a 5-6 membered, monocyclic or bicyclic heteroaryl with 1-3 heteroatoms, and A is unsubstituted or substituted with one or more substituents $R_{20}$ and $R_{20}$ is —OH, halogen, $CF_3$, $NH_2$, alkyl, heteroalkyl, alkoxy, or acetyl.

BRD4 ligands of Formula (IF) have the following structure

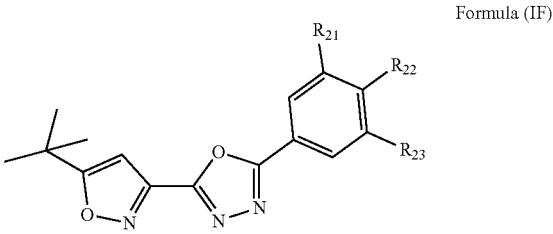

Formula (IF)

wherein $R_{21}$ and $R_{23}$ are independently selected from: —OH, halogen, $CF_3$, $NH_2$, alkyl, heteroalkyl, alkoxy, and acetyl; and $R_{22}$ is H, —OH, halogen, $CF_3$, $NH_2$, alkyl, heteroalkyl, alkoxy, or acetyl.

Non-limiting examples of compounds of Formulas (IA)-(IF) are disclosed in US 20190359573 A1 and herein incorporated by reference. A specific example of Formula (IB) that has the following structure.

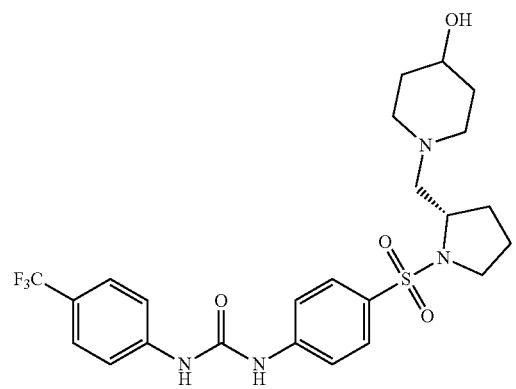 [SMILES: O=C(Nc1ccc(C(F)(F)F)cc1)Nc1ccc(S(=O)(=O)N2CCC[C@H]2CN2CCC(O)CC2)cc1]

Inhibition of multidomain scaffold proteins such as BRD4 is a particularly challenging problem in part because BRD4 inhibitors disrupt the activity of only one domain in the target protein. As a result, BRD4 protein accumulation can overcome the effect of competitive BRD4 inhibitors. In addition, using the traditional BRD4 inhibitor approach, high systemic exposure is needed to ensure sufficient in vivo inhibition of BRD4, leading to off-target side effects. To address this potential problem, the drug may include a proteolysis targeting chimera (PROTAC), which is a heterobifunctional small molecule including two covalently linked protein-binding molecules having the formula: BRD4 inhibitor-linker-ubiquitin ligase cereblon ligand, or a pharmaceutically acceptable salt thereof. The "right side" of the drug interacts with an E3 ubiquitin ligase and the "left side" binds to a target protein meant for degradation. PROTACs achieve degradation through "hijacking" the cell's Ubiquitin-Proteosome system (UPS). Not wishing to be bound by theory, recruitment of the E3 ligase to the target protein results in ubiquitination and subsequent degradation of the target protein by the proteasome.

Lu et al. ("Hijacking the E3 Ubiquitin Ligase Celebron to Efficiently Target BRD4," Chemistry & Biology, 22, p. 755-763) reported a BRD4 proteolysis targeting chimera using the PROTAC approach by recruiting BRD4 to the E3 ligase cereblon. The structures of the reported degraders incorporated known BRD4 inhibitors such as JQ-1 and an E3 ligase cereblon moiety (i.e., pomalidomide) linked by a polyether linker. The resulting PROTAC molecule (ARV-825) resulted in more significant and longer lasting c-MYC suppression and apoptotic induction than the BRD4 inhibitor alone. Similarly, JQ-1 has been used as the BRD4 inhibitor moiety in another BRD4 proteolysis targeting chimera with a different linker (dBET1) as described in US 20160243247A1. JQ1 is the first ligand identified for BRD4 protein and CRBN ligands have relatively good drug like properties. Generally, one needs to screen different types of linkers for the development of PROTACs. Although the effectiveness of BRD4 proteolysis targeting chimeras has been demonstrated in various cell-free assays in vitro, a limitation of the PROTAC approach is that the molecular weight is higher than that of discrete ligands/inhibitors, thus limiting passive diffusion so that the degrader can reach the biological target inside of the cell. Typically, the molecular weight of a compound should range from 200 to 600 grams per mole so that the inhibitor can undergo passive diffusion through the membrane. The strategy encapsulating PROTAC conjugates into cell targeting DMs enable carrier-mediated cellular entry to circumnavigate this limitation.

Advantageously, a BRD4 ligand and/or a BRD4 proteolysis targeting chimera encapsulated in multivalent DMs may selectively target and reduce the population of pathogenic myofibroblasts, ameliorating fibrosis and improving outcomes. As discussed above, the drug (i.e., a BRD4 ligand or a BRD4 proteolysis targeting chimera) is encapsulated within an amphiphilic dendron-coil. Each of the three amphiphilic dendron-coils have a non-peptidyl, hydrophobic core-forming component. The ability of BRD4 ligands and/or BRD4 proteolysis targeting chimeras to reside in the hydrophobic cores of the amphiphilic dendron-coils was a surprising and unexpected result because the structural components that are generally accepted as improving the drug-likeness of a ligand are likely to adversely affect the ability of the ligand to reside in the hydrophobic cores of the amphiphilic dendron-coils. In particular, ligands are generally designed for potency at the biological target and structurally optimized for drug-likeness so that the ligand is orally bioavailable. A druglike ligand desirably has both aqueous and lipid solubility so that it is soluble in the blood and can penetrate the lipid-based cell membrane to reach the inside of the cell. The incorporation of functional groups into the structure that are capable of hydrogen-bonding improve aqueous solubility, however, such groups are polar, rather than hydrophobic, and may adversely affect the ability of a ligand to reside in the hydrophobic cores of the amphiphilic dendron-coils.

The drug may include a BRD4 proteolysis targeting chimera having the formula BRD4 ligand-linker-ubiquitin ligase cereblon ligand. The E3 ligase cereblon ligand of the chimera may include ligands of Formula (IIA) or (IIB), or pharmaceutically acceptable salts thereof:

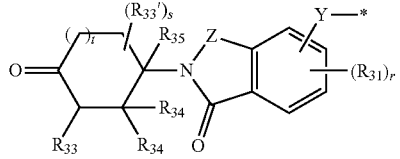

Formula (IIA)

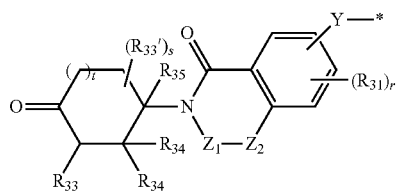

Formula (IIB)

wherein Y is a bond, $Y_1O$, NH, $NR_{32'}$, C(O)O, C(O)$NR_{32'}$, Yi-O, Y NH, Y $NR_{32}$, $Y_1$—C(O), $Y_1$—C(O)O, $Y_1$—OC(O), $Y_1$—C(O)$NR_{32'}$, or Y—$NR_{32'}$C(O), wherein Yi is $C_1$-$C_6$ alkylene, $C_2$-$C_6$ alkenylene, or $C_2$-$C_6$ alkynylene;

Z is C(O) or C($R_{33}$)$_2$;

$Z_1$-$Z_2$ is C($R_{33}$)=N or C($R_{33}$)$_2$—C($R_{33}$)$_2$;

each $R_{31}$ is independently halogen, nitro, NH$_2$, OH, C(O)OH, $C_1$-$C_6$ alkyl, or $C_1$-$C_6$ alkoxy; $R_{32}$ is $C_1$-$C_6$ alkyl, $C_2$-$C_6$ alkenyl, $C_3$-$C_8$ cycloalkyl, 3- to 8-membered heterocycloalkyl, C(O)—$C_1$-$C_6$ alkyl, C(O)—$C_2$-$C_6$ alkenyl, C(O)—$C_3$-$C_8$ cycloalkyl, or C(O)-3- to 8-membered heterocycloalkyl, and $R_{32}$ is optionally substituted with one or more of halogen, N($R_a$)$_2$, NHC(O)$R_a$, NHC(O)O$R_a$, O$R_b$, $C_3$-$C_8$ cycloalkyl, 3- to 8-membered heterocycloalkyl, $C_6$-$C_{10}$ aryl, or 5- to 10-membered heteroaryl, wherein each of the $C_3$-$C_8$ cycloalkyl, 3- to 8-membered heterocycloalkyl, $C_6$-$C_{10}$ aryl or 5- to 10-membered heteroaryl is optionally further substituted with one or more of halogen, NH$_2$, CN, nitro, OH, C(O)OH, $C_1$-$C_6$ alkyl, $C_1$-$C_6$ haloalkyl, $C_1$-$C_6$ alkoxy, or $C_1$-$C_6$ haloalkoxy;

$R_{32'}$ is H, $C_1$-$C_6$ alkyl, $C_2$-$C_6$ alkenyl, $C_3$-$C_8$ cycloalkyl, or 3- to 8-membered heterocycloalkyl, and $R_{32'}$ when not being H, is optionally substituted with one or more of halogen, N($R_a$)$_2$, NHC(O)$R_a$, NHC(O)O$R_a$, O$R_b$, $C_3$-$C_8$ cycloalkyl, 3- to 8-membered heterocycloalkyl, $C_6$-$C_{10}$ aryl, or 5- to 10-membered heteroaryl, wherein each of the $C_3$-$C_8$ cycloalkyl, 3- to 8-membered heterocycloalkyl, $C_6$-$C_{10}$ aryl or 5- to 10-membered heteroaryl is optionally further substituted with one or more of halogen, NH$_2$, CN, nitro, OH, C(O)OH, $C_1$-$C_6$ alkyl, $C_1$-$C_6$ haloalkyl, $C_1$-$C_6$ alkoxy, or $C_1$-$C_6$ haloalkoxy;

each $R_{33}$ is independently H or $C_1$-$C_3$ alkyl optionally substituted with $C_6$-$C_{10}$ aryl or 5- to 10-membered heteroaryl;

each $R_{33'}$ is independently $C_1$-$C_3$ alkyl;

each $R_{34}$ is independently H or $C_1$-$C_3$ alkyl; or two $R_{34}$, together with the carbon atom to which they are attached, form C(O), a $C_3$-$C_6$ carbocycle, or a 4-, 5-, or 6-membered heterocycle comprising 1 or 2 heteroatoms from N and O;

$R_5$ is H, $C_1$-$C_3$ alkyl, F, or Cl;

each $R_a$ independently is H or $C_1$-$C_6$ alkyl;

$R_b$ is H or tosyl;

t is 0 or 1;

r is 0, 1, 2 or 3;

s is 0, 1 or 2; and

* indicates a bond to the linker.

Non-limiting examples of ligands of Formulas (IIA)-(IIB) are disclosed in US 20160243247 A1 and herein incorporated by reference.

In the BRD4 proteolysis targeting chimeras, a linker is present that covalently binds the BRD4 ligand and the E3 ligase cereblon ligand. The linker has the following structure of Formula (III) or a pharmaceutically acceptable salt thereof:

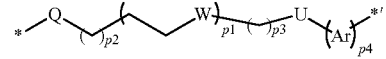

Formula (III)

wherein p1 is an integer from 0 to 12; p2 is an integer from 0 to 12; p3 is an integer from 0 to 6; p4 is an integer from 0 to 2; each W is independently absent, CH$_2$, O, S, NH or NR$_{45}$; U is absent, CH$_2$, O, NH or NR$_{45}$; each R$_{45}$ is independently $C_1$-$C_3$ alkyl;

Q is absent, —C(O)NH—, —C(O)O—, —CH$_2$C(O)NH—, or —CH$_2$C(O)O— when p3 is an integer from 1 to 6; or Q is Q$_1$, —$C_1$-$C_4$ alkylene-Q$_2$, or Q$_1$-$C_1$-$C_4$ alkylene-Q$_2$ when p3 is an integer from 0 to 6, wherein each of Q$_1$ and Q$_2$ independently is $C_3$-$C_8$ cycloalkylene, 3- to 8-membered heterocycloalkylene, $C_6$-$C_{10}$ arylene, or 5- to 10-membered heteroarylene, each of which is optionally substituted with one or more of halogen, NH$_2$, CN, nitro, OH, C(O)OH, $C_1$-$C_6$ alkyl, $C_1$-$C_6$ haloalkyl, $C_1$-$C_6$ alkoxy, or $C_1$-$C_6$ haloalkoxy; each occurrence of Ar is $C_6$-$C_{10}$ arylene or 5- to 10-membered heteroarylene, * indicates a bond to the BRD4 ligand; and *' indicates a bond to the E3 ligase cereblon ligand.

Non-limiting examples of the linkers of Formula (III) are disclosed in US 20160243247 A1 and herein incorporated by reference.

The BRD4 proteolysis targeting chimeras include the following compounds:

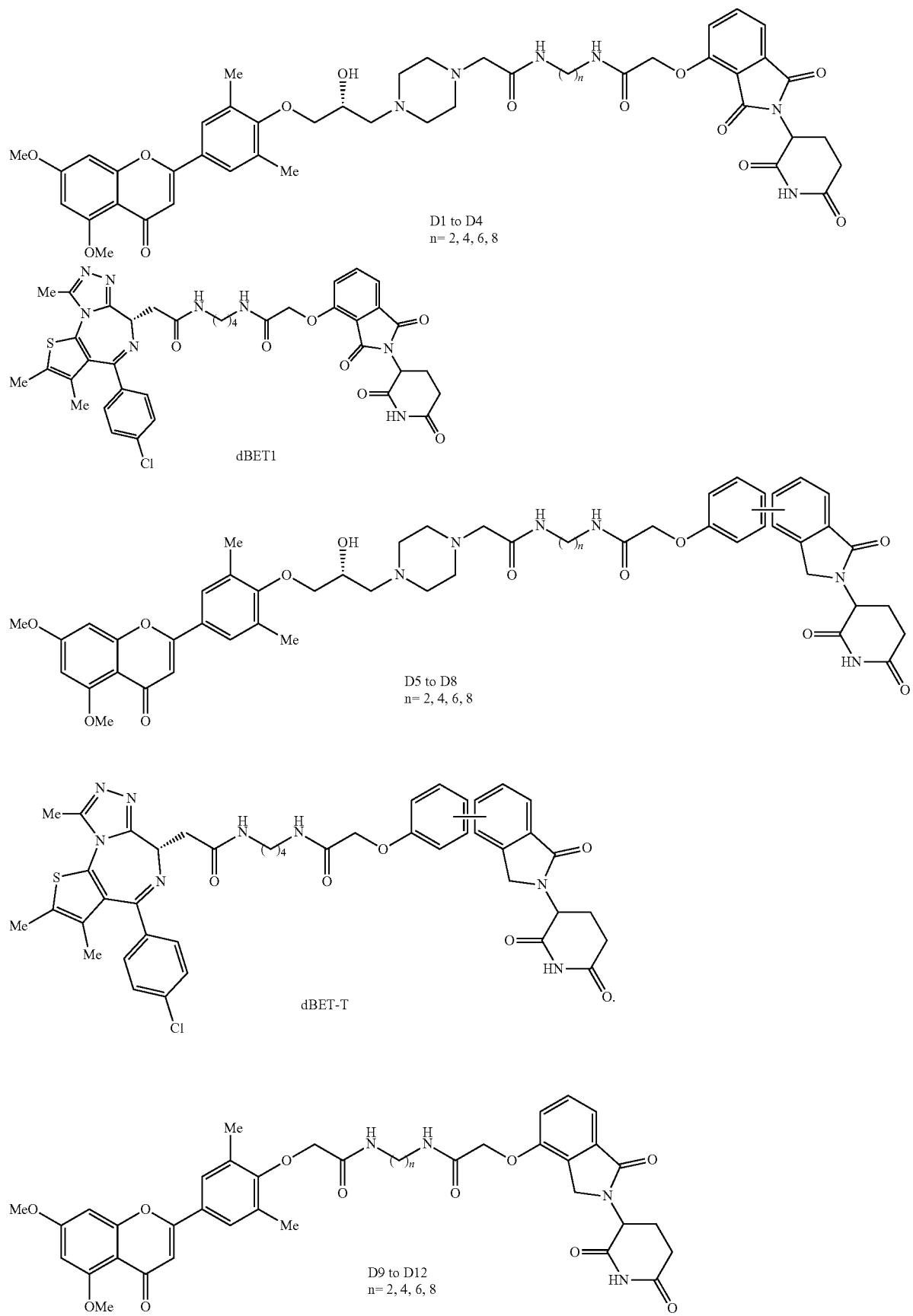

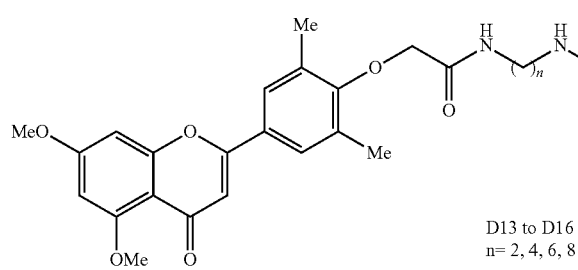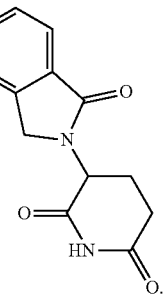

D13 to D16
n = 2, 4, 6, 8

The amount of drug present in the micelle can vary over a wide range. The drug can be about 1% to about 30% (weight/weight) of the total mass of the micelle (wherein the mass of the drug is included in the total mass of the micelle). In some aspects, the drug can be about 2% to about 25% w/w of the total mass of the micelle (same basis). In some aspects, the drug can be about 3% to about 20% w/w of the total mass of the micelle (same basis).

In an aspect, the ligand increases the selective delivery of the micelle to a particular target organ, tissue or cell. Target organs may include, for example, the liver, pancreas, kidney, lung, esophagus, larynx, bone marrow, and brain. In some aspects, the increase in selective delivery may be at least about two-fold as compared to that of an otherwise comparable composition lacking the targeting agent. In some aspects, the delivery of the micelle containing a ligand to the target organ, tissue or cell is increased by at least 10% or 25% compared to that of an otherwise comparable composition lacking the ligand.

The amount of ligand present in a micelle can vary over a wide range. In some aspects, the ligand can be about 1% to about 80% (weight/weight), specifically about 10% to about 50% w/w, and more specifically be about 20% to about 40% w/w of the total mass of the micelle (wherein the mass of the ligand is included in the total mass of the nanocore).

In aspects, the ligand may be conjugated to the micelle through a covalent bond to PEG. A variety of mechanisms known in the art can be used to form the covalent bond between the ligands and PEG, e.g., a condensation reaction. Additional methods for directly bonding one or more ligands to PEG are known in the art. Chemistries include, but are not limited to, thioether, thioester, malimide and thiol, amine-carboxyl, amine-amine, and others listed in organic chemistry manuals. Ligands can also be attached to PEG using a crosslinking reagent [e.g., glutaraldehyde (GAD), bifunctional oxirane (OXR), ethylene glycol diglycidyl ether (EGDE), N-hydroxysuccinimide (NHS), and a water soluble carbodiimide, such as 1-ethyl-3-(3-dimethylaminopropyl) carbodiimide (EDC)]. The compositions herein can further have at least one hydrolysable linker between the therapeutic agent and scaffold and/or targeting agent and scaffold.

In an aspect, the micelles can include one or more imaging agents or radiosensitizing molecules. Non-limiting examples of paramagnetic ions of potential use as imaging agents include chromium (III), manganese (II), iron (III), iron (II), cobalt (II), nickel (II), copper (II), neodymium (III), samarium (III), ytterbium (III), gadolinium (III), vanadium (II), terbium (III), dysprosium (III), holmium (III) and erbium (III), with gadolinium being particularly preferred. Ions useful in other contexts, such as X-ray imaging, include but are not limited to lanthanum (III), gold (III), lead (II), and especially bismuth (III). Radioisotopes of potential use as imaging or therapeutic agents include astatine$^{211}$, carbon$^{14}$, chromium$^{51}$, chlorine$^{36}$, cobalt$^{57}$, cobalt$^{58}$, copper$^{52}$, copper$^{64}$, copper$^{67}$, fluorine$^{18}$, gallium$^{67}$, gallium$^{68}$, hydrogen$^{3}$, iodine$^{123}$, iodine$^{124}$, iodine$^{125}$, iodine$^{131}$, indium$^{111}$, iron$^{52}$, iron$^{59}$, lutetium$^{177}$, phosphorus$^{32}$, phosphorus$^{33}$, rhenium$^{186}$, rhenium$^{188}$, and selenium$^{75}$I$^{125}$ is used in some embodiments, and indium$^{111}$ is also used in some embodiments due to its low energy and suitability for long-range detection.

In some aspects, the imaging agent is a secondary binding ligand or an enzyme (an enzyme tag) that will generate a colored product upon contact with a chromogenic substrate. Examples of enzymes include urease, alkaline phosphatase, (horseradish) hydrogen peroxidase and glucose oxidase. Secondary binding ligands are biotin and avidin or streptavidin compounds. The use of such labels is well known in the art.

In some aspects, the imaging agent is a fluorescent label. Non-limiting examples of photodetectable labels include ALEXA FLUOR® 350, ALEXA FLUOR® 430, AMCA, aminoacridine, BODIPY 630/650, BODIPY 650/665, BODIPY-FL, BODIPY-R6G, BODIPY-TMR, BODIPY-TR, 5-carboxy-4$^{1}$, 5'-dichloro-2$^{1}$, 7$^{1}$-dimethoxy fluorescein, 5-carboxy-2',4',5',7'-tetrachlorofluorescein, 5-carboxyfluorescein, 5-carboxyrhodamine, 6-carboxyrhodamine, 6-carboxytetramethyl amino, Cascade Blue, Cy2, Cy3, Cy5,6-FA, dansyl chloride, Fluorescein, HEX, 6-JOE, NBD (7-nitrobenz-2-oxa-1,3-diazole), Oregon Green 488, Oregon Green 500, Oregon Green 514, Pacific Blue, phthalic acid, terephthalic acid, isophthalic acid, cresyl fast violet, cresyl blue violet, brilliant cresyl blue, para-aminobenzoic acid, erythrosine, phthalocyanines, azomethines, cyanines, xanthines, succinylfluoresceins, rare earth metal cryptates, europium trisbipyridine diamine, a europium cryptate or chelate, diamine, dicyanins, La Jolla blue dye, allopycocyanin, allococyanin B, phycocyanin C, phycocyanin R, thiamine, phycoerythrocyanin, phycoerythrin R, REG, Rhodamine Green, rhodamine isothiocyanate, Rhodamine Red, ROX, TAMRA, TET, TRIT (tetramethyl rhodamine isothiol), Tetramethylrhodamine, Edans and TEXAS RED. These and other luminescent labels may be obtained from commercial sources such as Molecular Probes (Eugene, Oreg.), and EMD Biosciences (San Diego, Calif.).

Chemiluminescent agents include luminol, isoluminol, an aromatic acridinium ester, an imidazole, an acridinium salt and an oxalate ester, or a bioluminescent compound such as luciferin, luciferase and aequorin. Diagnostic conjugates may be used, for example, in intraoperative, endoscopic, or intravascular tumor or disease diagnosis.

In some aspects, the outer surface of the micelle is modified. One example of such a modification is modification of the outer surface of the micelle with a long-circulating agent, e.g., glycosaminoglycans. Examples of glycosaminoglycans include hyaluronic acid. The micelles may also, or alternatively, be modified with a cryoprotectant, e.g., a sugar, such as trehalose, sucrose, mannose, glucose or HA. The term "cryoprotectant" refers to an agent that protects a lipid particle subjected to dehydration-rehydration, freeze-thawing, or lyophilization-rehydration from vesicle fusion and/or leakage of vesicle contents.

Also included are pharmaceutical compositions comprising the micelles described herein.

As used herein, "pharmaceutical composition" means therapeutically effective amounts of the nanoparticles together with a pharmaceutically acceptable excipient, such as diluents, preservatives, solubilizers, emulsifiers, and adjuvants. As used herein "pharmaceutically acceptable excipients" are well known to those skilled in the art.

In an aspect, administration is by oral inhalation. Exemplary delivery by oral inhalation includes a nebulizer device, a dry powder inhaler, or a metered dose inhaler.

Pharmaceutical compositions may conveniently be presented in unit dosage form and may be prepared by any of the methods well known in the art of pharmacy. The term "unit dosage" or "unit dose" means a predetermined amount of the active ingredient sufficient to be effective for treating an indicated activity or condition. Making each type of pharmaceutical composition includes the step of bringing the active compound into association with a carrier and one or more optional accessory ingredients. In general, the formulations are prepared by uniformly and intimately bringing the active compound into association with a liquid or solid carrier and then, if necessary, shaping the product into the desired unit dosage form.

In an aspect, a method of making a self-assembled therapeutic dendron-micelle comprises synthesizing a first amphiphilic dendron-coil by covalently linking a first non-peptidyl, hydrophobic core-forming component to a first polyester dendron, covalently linking the first polyester dendron to a first poly(ethylene glycol) (PEG) moiety, and conjugating a therapeutic to the first PEG moiety; synthesizing a second amphiphilic dendron-coil by covalently linking a second non-peptidyl, hydrophobic core-forming component to a second polyester dendron, covalently linking the second polyester dendron to a second poly(ethylene glycol) (PEG) moiety, wherein the second PEG moiety does not comprise a conjugated peptide; and incubating the first and second amphiphilic dendron-coils under conditions for self-assembly of the self-assembled therapeutic dendron-micelle.

Optionally, the method comprises synthesizing a third amphiphilic dendron-coil by covalently linking a third non-peptidyl, hydrophobic core-forming component to a third polyester dendron, covalently linking the third polyester dendron to a third poly(ethylene glycol) (PEG) moiety, and conjugating a second therapeutic peptide to the third PEG moiety, and incubating the third amphiphilic dendron-coil with the first and second amphiphilic dendron-coils.

In an aspect, the first, second and/or third amphiphilic dendron-coils can be synthesized using click chemistry between the hydrophobic core-forming component and the polyester dendron. Other art-known chemistries may also be used.

In an aspect, conjugating the peptides comprises $NH_2$-PEG-tBOC conjugation, followed by deprotection with TFA. Other art-known chemistries may also be used.

In another aspect, the DM compositions described herein are administered by oral inhalation to treat pulmonary diseases such as interstitial lung diseases, including interstitial pulmonary fibrosis (IPF) and ILD from SarsCoV2. ILDs are a spectrum of is a lethal fibrosing lung disease affecting those with environmental exposures, such as smoking and burn pit exposures, advancing age and infections by Severe Acute Respiratory Syndrome (SARS)-coronavirus 2 (CoV2). The DMs described herein are an aerosolized cell-targeted nanoparticle to reverse the loss of pulmonary function in the various forms of ILD. In the specific case of IPF, IPF is a chronically progressive, lethal disease that affects over 120,000 US citizens. This diagnosis results in the death of over 48,000 Americans from progressive respiratory failure, typically within 3-5 years after diagnosis. Although infectious causes have not been typically associated with ILD, compelling evidence is now emerging that COVID-19 acute respiratory disease syndrome (ARDS) is associated with ILD. COVID-19 infection results in ARDS in patients who are aged, smoke, hypertensive or who are obese. In COVID-19 ARDS, circulating components of extracellular matrix (ECM) remodeling, including hyaluronans, type III procollagen (COL) and laminin are associated with increased with disease severity. In survivors, radiographic evidence of pulmonary scarring and functional defects in lung function (diffusion capacity) are commonly seen. In fatal cases, increases in transforming growth factor (TGF)-ECM networks, including upregulated TGFBR2, COL isoforms and fibronectin (FN1)(12) are seen, and pulmonary fibrosis is found on autopsy Although the long-term outcomes of lung scarring/fibrosis in survivors of COVID-19 ARDS is not known due to the short-term follow-up, post-infectious pulmonary fibrosis has been reported in survivors from severe acute respiratory syndrome [SARS, (28)]. With an overall ~60% survival rate, those with COVID-19 ARDS will have residual reduction in pulmonary function and abnormalities that mimic ILD.

The invention is further illustrated by the following non-limiting examples.

EXAMPLES

Example 1

Role of BRD4 in Mediating TGFB—Induced NOX4 and Myofibroblast Transition In Vitro TGFB potently upregulated expression of TGLN/SM22α, NOX4 and FN1, characteristic of myofibroblast phenotype (FIG. 1). This effect was substantially reduced by the small molecule BRD4i, JQ1. JQ1, a competitive inhibitor of the BET bromodomain pocket, a BRD4 protein domain that binds acetylated residues, effectively blocked NOX4/SM22α/FN1 expression (FIG. 1 A,B,C). TGFβ is a potent activator of fibroblast contractility, measured by retraction of collagen plugs. Contractility was also effectively inhibited by JQ1 treatment. To further demonstrate that BRD4 isoform specifically mediated these effects, siRNA was used to silence both the long and short BRD4 variants, reducing BRD4 protein by 80% in western blot (FIG. 1E). Under these conditions, NOX4 expression was reduced by >50% (FIG. 1F), as well as SM22a (not shown). These data indicate that BRD4 is required for TGFβ-induced myofibroblast transdifferentiation.

BRD4 is a member of the bromodomain and extraterminal (BET) protein family, containing two conserved bromodomains (BD). The BD is a high-affinity binding pocket for BRD4 binding to acetylated Lys residues on histones and transcription factors critical for histone acetyltransferase (HAT) activity. Small molecule BRD4 inhibitors that interact with the BRD4 BD inhibit BRD4 function by displacing BRD4 from genome binding sites, disrupting coactivator binding, and inhibiting its atypical HAT activity. A major limitation of pharmacological approaches to modifying BRD4 is that available inhibitors have poor selectivity for BRD isoforms. A third generation BRD4 inhibitor (BRD4i) with high selectivity for the BRD4 BD1 domain has been identified. This compound, ZL0591, binds with approximately 100 nM affinity to BRD4 BD1, but has 10× lower affinity for the BRD4 BD2 domain, and similarly has low affinity for BRD3. JQ1, by contrast, shows no discrimination between BRD isoforms (data not shown).

Example 2

Efficacy of BRD4I, ZL0591 in Reversing Pulmonary Fibrosis

Figure 2:
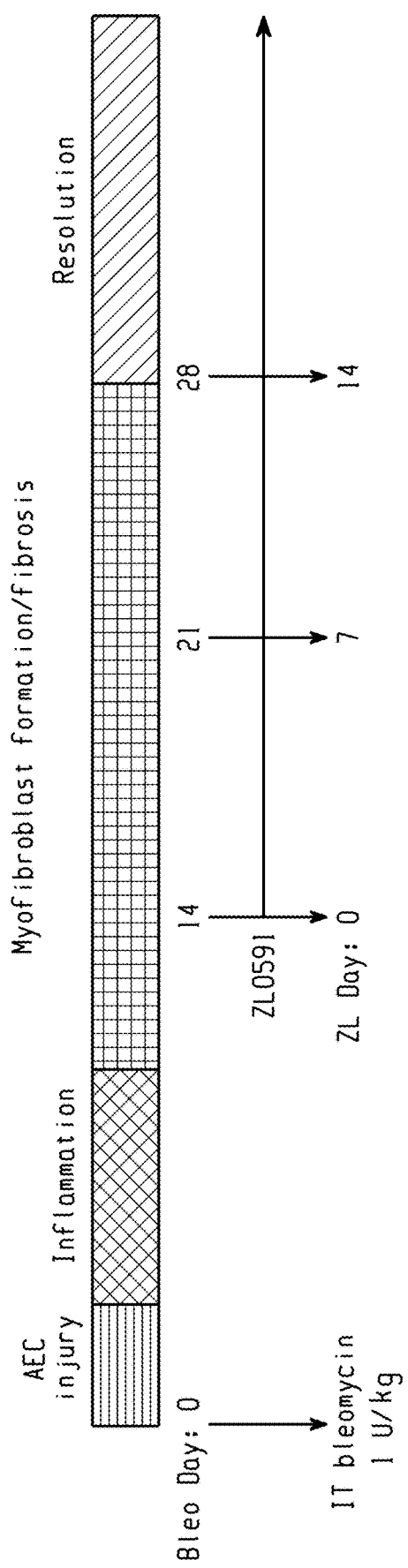
FIG. 2 shows the experimental design. Shown is a timeline of bleo-induced pulmonary fibrosis (Days are after bleo administration). 14d after Bleo treatment, ZL0591 was administered by IP (10 mg/kg/d).
Figure 3:
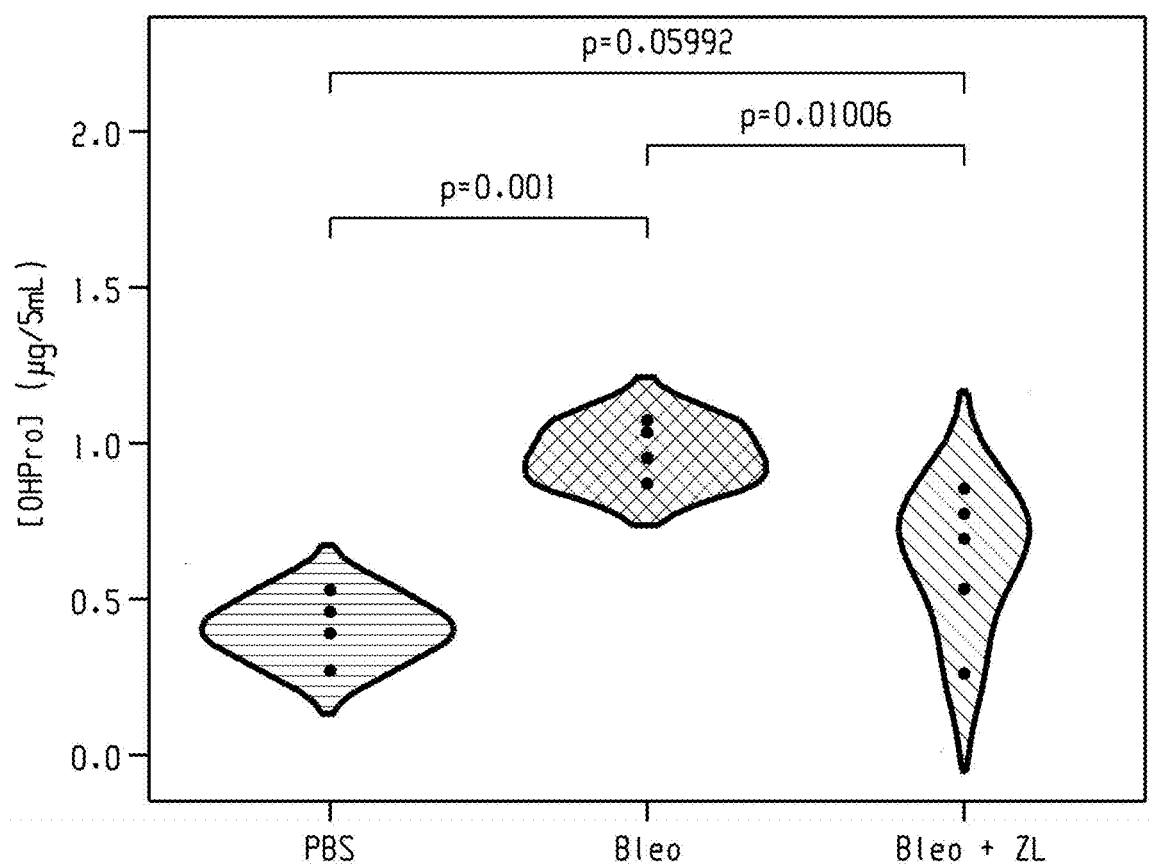
FIG. 3 shows BRD4i reduces hydroxyproline (OHPro) content. Violin plots of total lung OHPro of mice on d 28; 14 d after ZL0591 treatment. Tukey's post-hoc T test values are shown.

Bleomycin-induced fibrosis is a well-accepted model of environmental lung injury and UPR-driven fibrosis. Lung injury produced by this model evolves through three temporally and pathologically distinct phases—acute inflammation (d1-7), fibrosis (d8-28) and resolution (d28 and later). Evaluation of the therapeutic effect of BRD4i, ZL0591, is best done in a therapeutic design strategy where drug is administered 14 d after bleomycin injury, during the established "fibrotic" phase (FIG. 2). Using this well-established model of pulmonary fibrosis, we evaluated the anti-fibrotic effect of systemically administered ZL0591 (10 mg/kg/dose). We observed that BRD4i/ZL0591 significantly reduced pulmonary collagen content as measured by hydroxyproline abundance in the total lung homogenates after 14 d of treatment (FIG. 3).

Figure 4A:
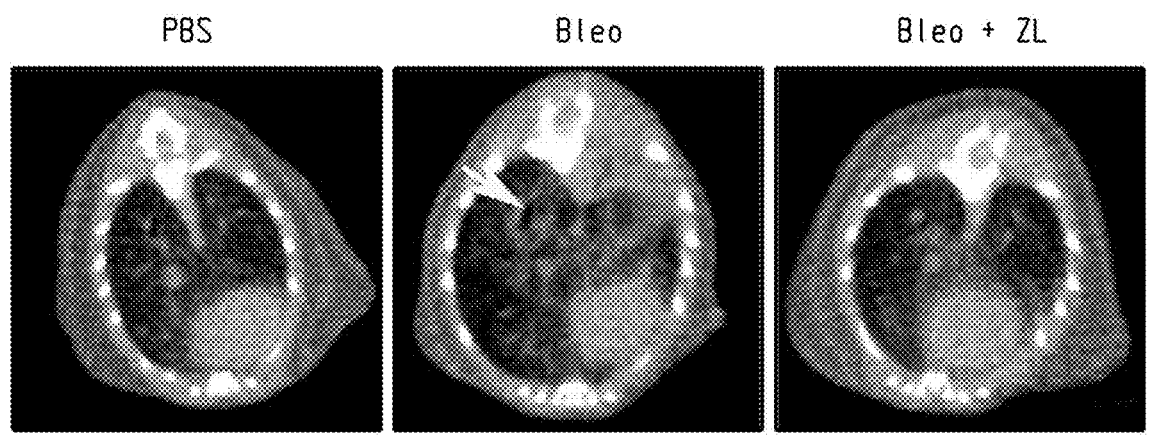
FIGS. 4A and B show the effect of BRD4i on fibrosis. 4A shows individual microCT images of mice from PBS, Bleomycin (Bleo) treated and Bleo+ZL0591 (BRD4i) treated groups. Induction of fibrosis is shown by white arrow is reduced by BRD4i treatment. 4B shows violin plot of cohort quantification. Tukey post-hoc T test values are shown for group comparison.
Figure 4B:
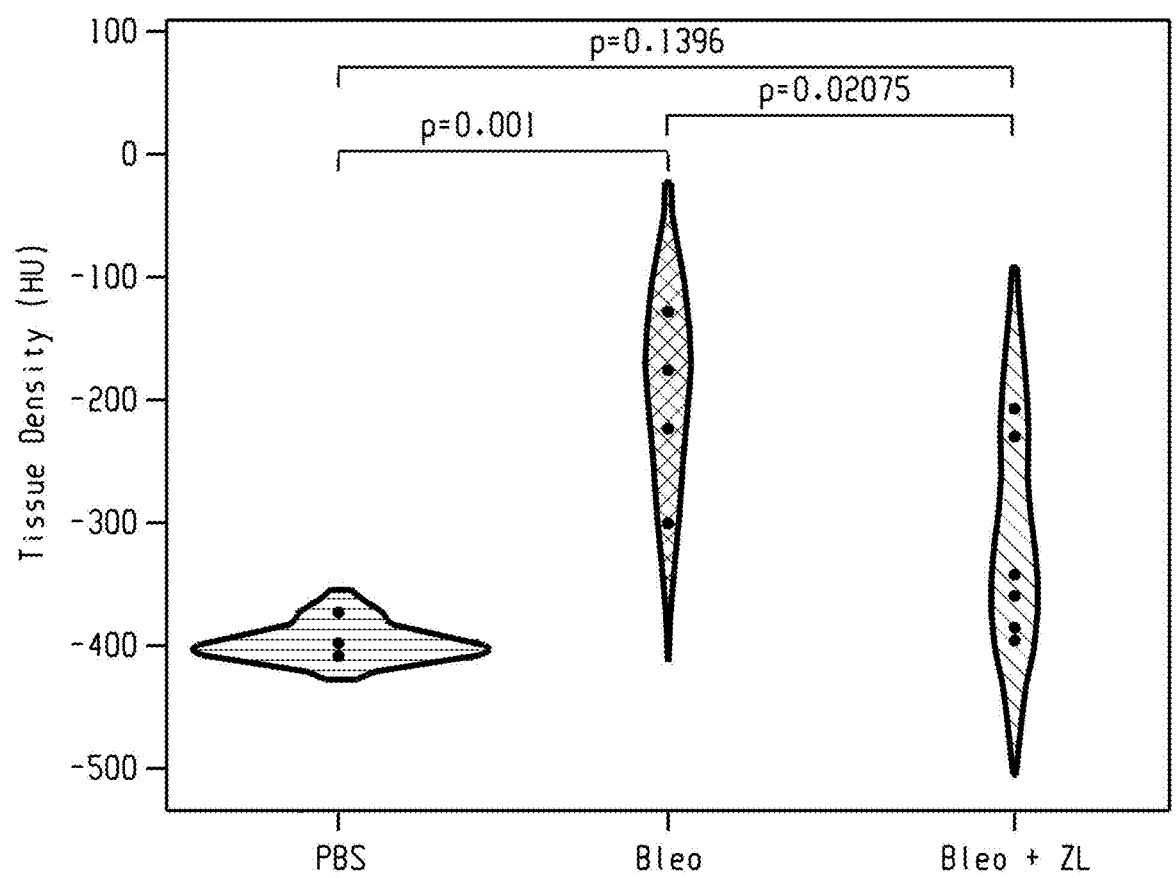
Figure 5A:
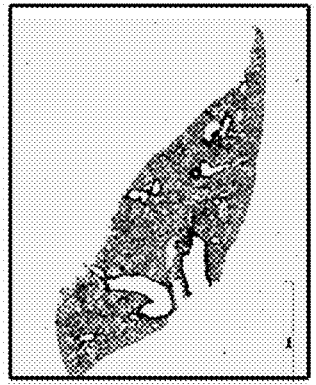
FIGS. 5A and B show the effect of BRD4i on lung histology. 5A shows Massons Trichrome staining of fixed lung sections from PBS, Bleo, and Bleo+ZL0591 treatment groups. Below each image is the modified Ashcroft score. 5B shows quantification of Ashcroft scoring for entire study group. *, $p<0.05$.
Figure 5A:
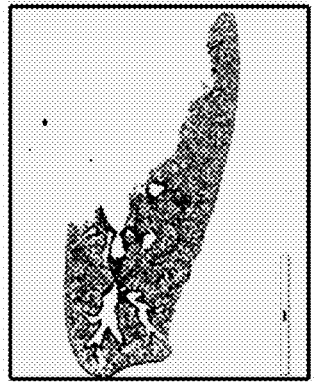
Figure 5A:
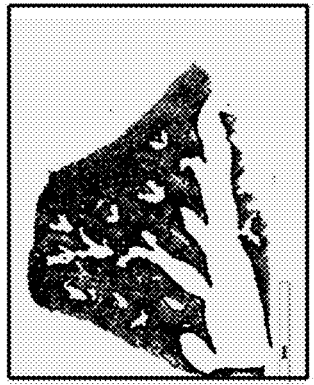
Figure 5A:
Figure 5A:
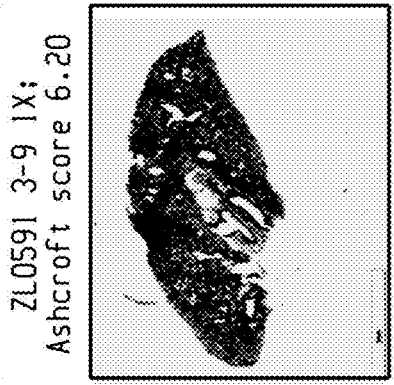
Figure 5A:
Figure 5A:
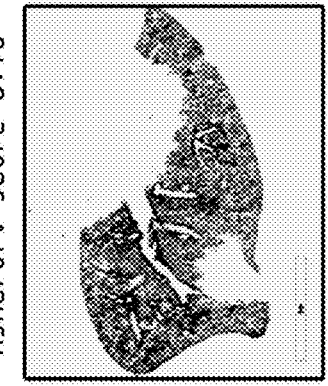
Figure 5B:
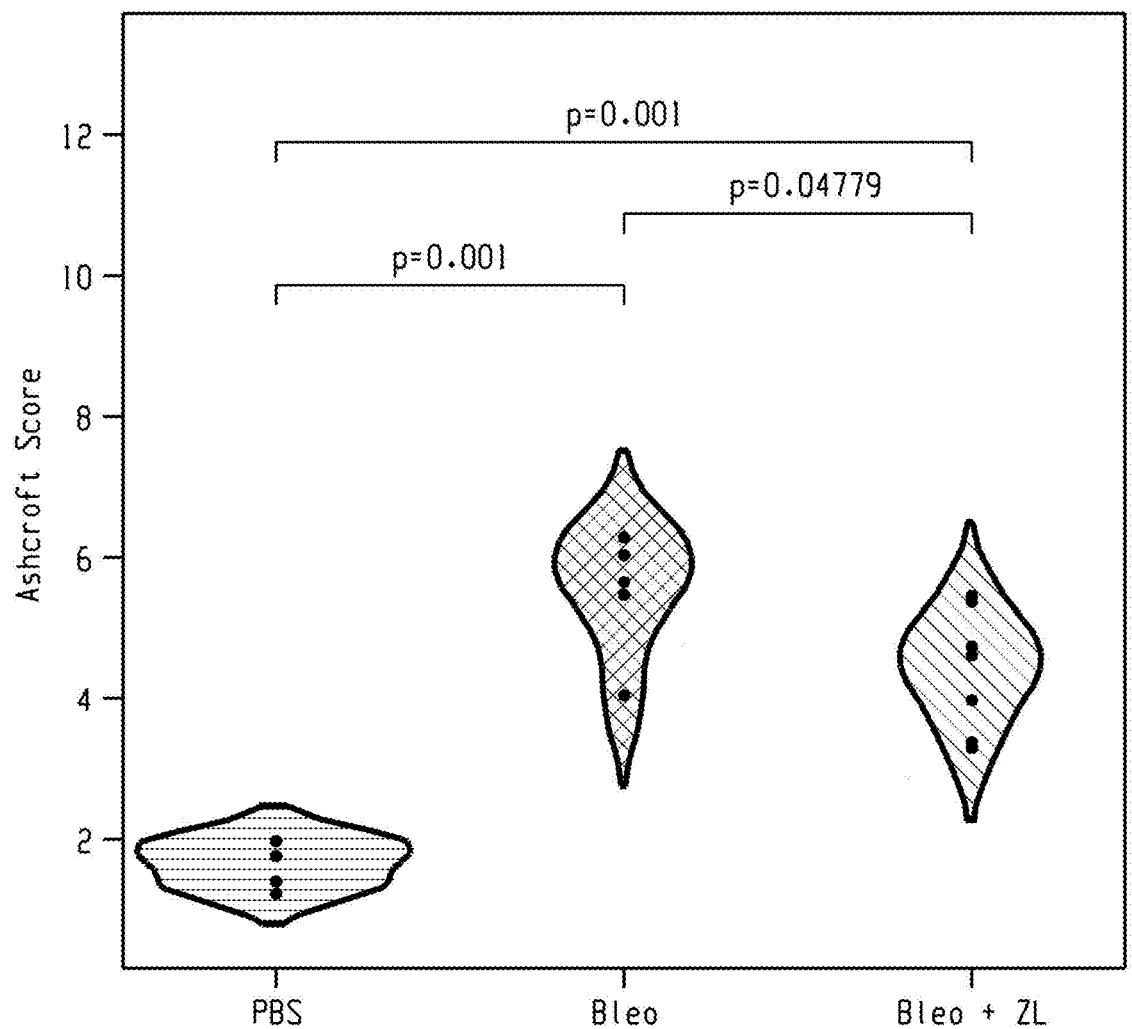

At the same time, microCT measurements indicated reduction in lung density in the ZL treated animals compared to bleomycin treated only (FIG. 4A, B). To examine the effects on lung fibrosis, fixed lung sections were stained with Massons Trichrome stain and imaged under low power. The appearance of fibrosis and alveolar consolidation was dramatically induced by the Bleomycin treatment (FIG. 5A). By contrast, the treatment with BRD4i/ZL0591 substantially reduced the alveolar consolidation and fibrotic pattern, consistent with the reduction in hydroxyproline measurements (FIG. 3). The sections were also scored using a modified Ashcroft scoring method by an independent pathologist. The reduction in Ashcroft indices was statistically significant (FIG. 5B). Finally, an increase in blood oxygen saturation in bleomycin- and BRD4 inhibitor-treated animals compared to controls was observed, further corroborating the ability of this approach to reverse the fibrotic response and associated pathological symptoms.

Example 3

Synthesis and Preparation of DMS

A series of PEGylated dendron coils (PDCs) are designed to be well suited for a modular drug delivery vehicle, consisting of poly-ε-caprolactone (PCL), G3 polyester dendron, and poly(ethylene glycol) (PEG). Note that each of the polymer components is either approved by FDA for human use or known to be biocompatible and biodegradable, which will facilitate the translation of this technology. Two different molecular weights (MWs) of PCL (3.5 and 14 kDa) and mPEG (2 and 5 kDa) were used to vary the hydrophilic-lipophilic balances (HLBs) of the resulting PDCs.

Figure 6A:
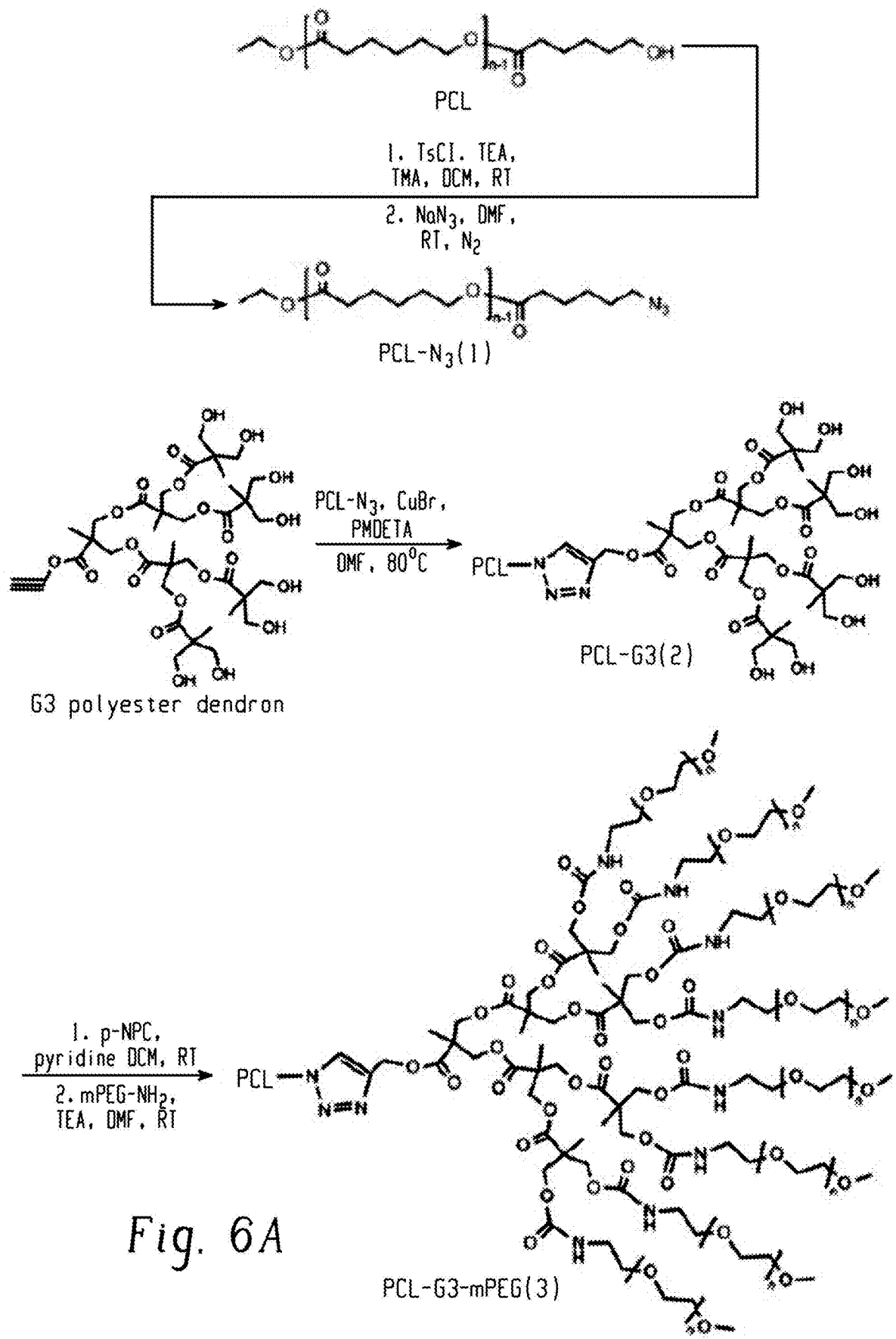
FIGS. 6A-D show the multi-step synthesis of dendron-based block copolymers. 6A shows chemical scheme of conjugation of PCL, G3 dendron, and PEG; 6B shows 1H NMR spectra confirming each synthetic steps; 6C shows GPC chromatograms showing increases in molecular weight upon conjugation of each polymer; and 6D shows FTIR spectra confirming the PCL-dendron conjugation by observing disappearance of the azide group at ~2,200 cm-1.
Figure 6B:
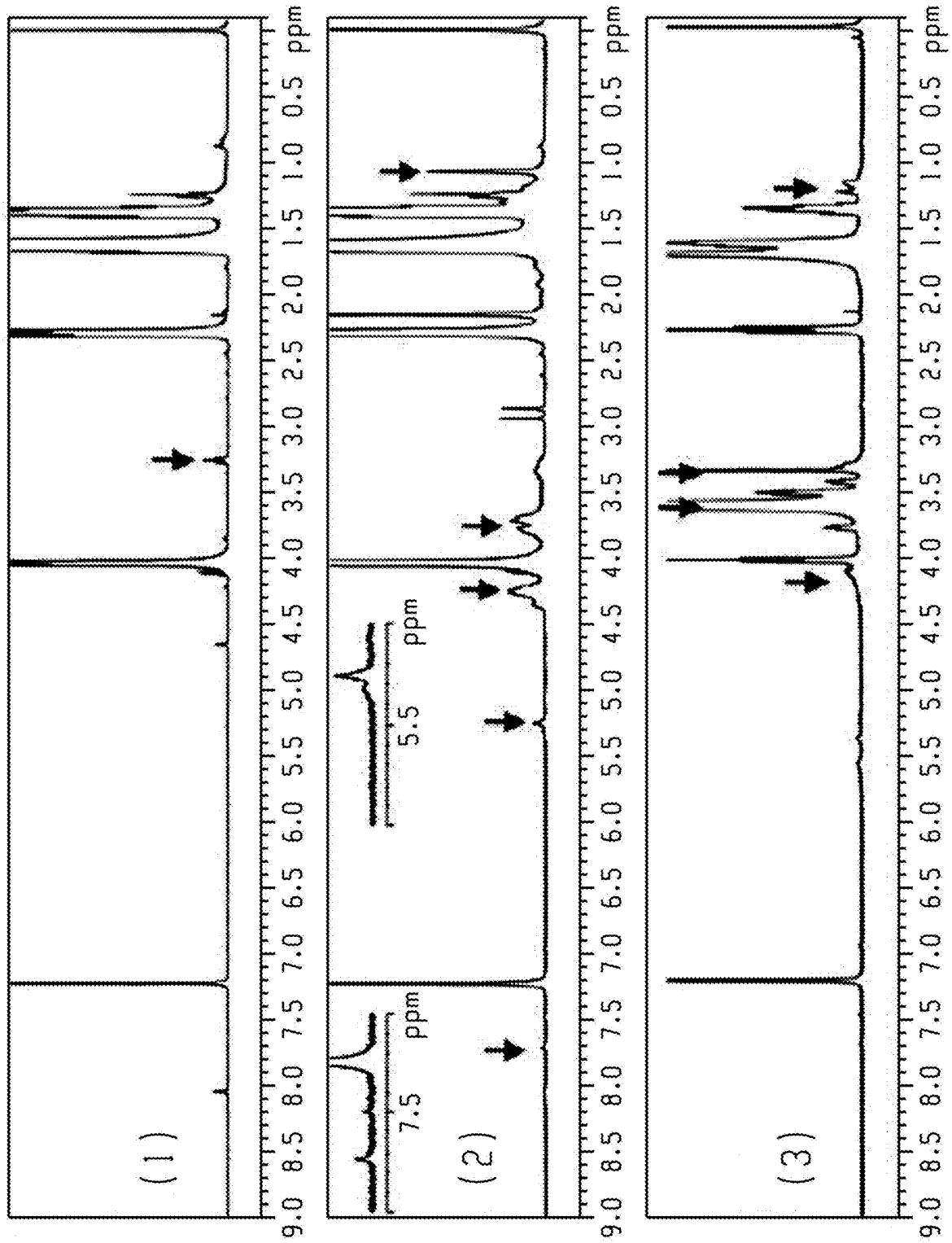
Figure 6D:
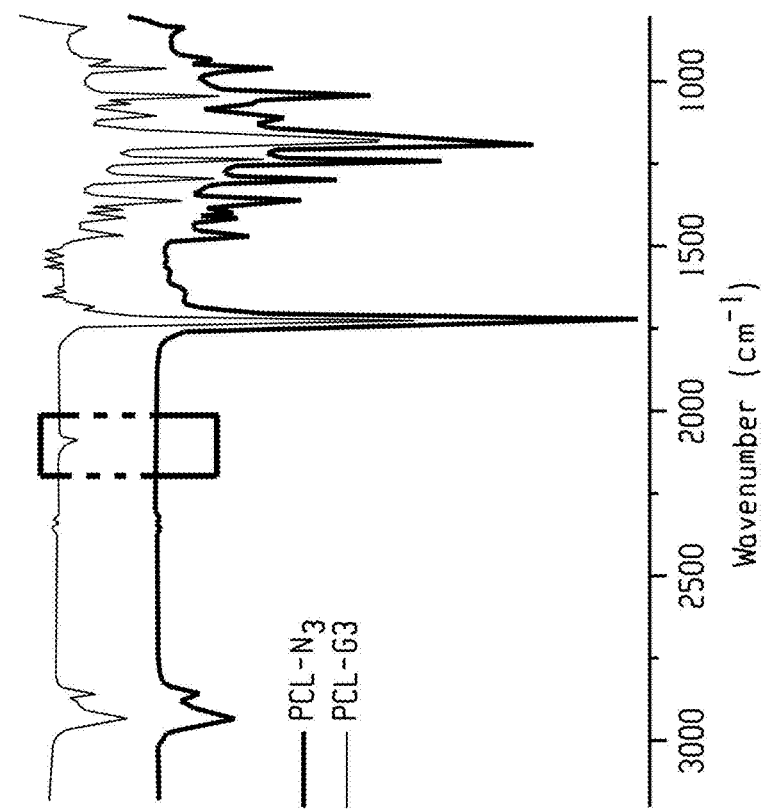
Figure 6C:
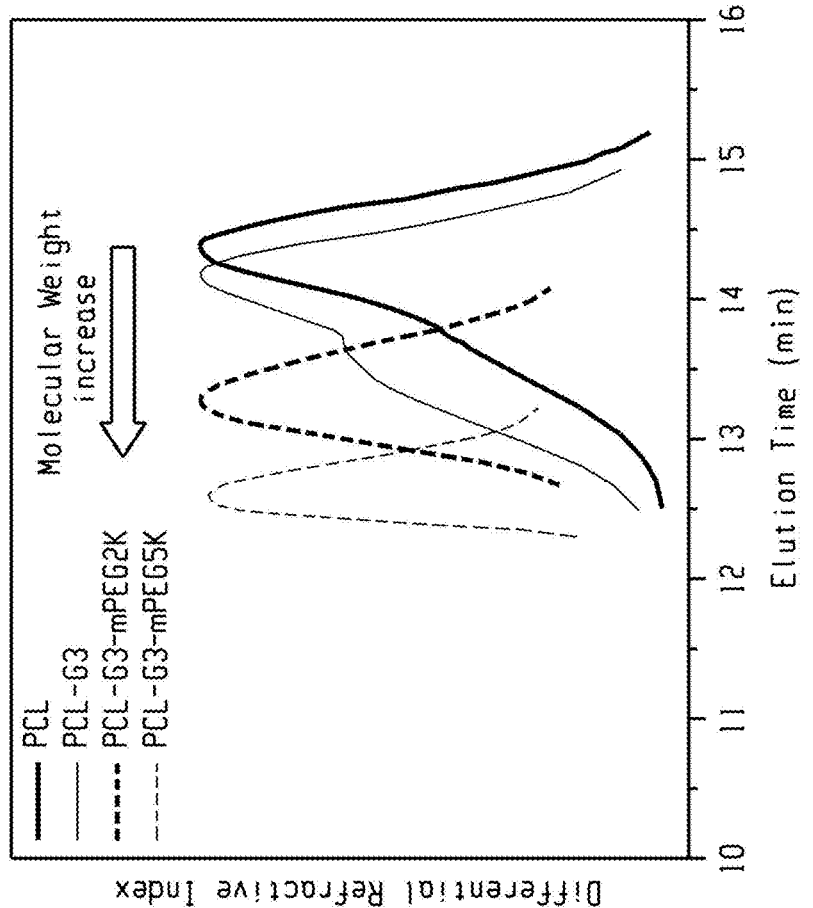

The synthetic route and characterization of the PDCs are summarized in FIG. 6A. The terminal hydroxyl group of PCL was first converted to an azide group (PCL-N3) for subsequent click chemistry with the dendron, as confirmed using $_1$H-NMR (FIG. 6B). The G3 dendron bearing an acetylene group at the focal point was reacted with PCL-N3 via "click chemistry" to yield the PCL-G3 copolymers (FIG. 6B,D). Then, PCL-G3 copolymers were conjugated with methoxy-terminated PEG (mPEG), following activation of the surface hydroxyl groups of the dendrons with p-nitrophenyl chloroformate (p-NPC). The MWs and molecular weight distribution (MWD=$M_w/M_n$, 1.0 meaning perfectly monodisperse) of all intermediate and final products were measured using gel permeation chromatography (GPC) as shown in FIG. 6C. In parallel, the linear copolymer counterparts with the same MW polymers, without dendrons, were also prepared by a similar protocol using p-NPC activation of the hydroxyl group on PCL, followed by mPEG conjugation. All 8 amphiphilic copolymers (4 dendron-based and 4 linear) were successfully synthesized with low MWDs (<1.4). Functionalized PDCs containing rhodamine as a fluorophore and folic acid (FA) as a model targeting agent have also been synthesized. Briefly, PCL14K-G3 was reacted with molar excess (20×) of PEG diamine, resulting in PCL-G3-PEG-NH$_2$. The copolymers were then conjugated with either n-succinimidyl ester (NHS)-functionalized rhodamine (Rho) or FA using the same chemistry published previously. Synthesis of the two copolymers were confirmed using $_1$H NMR and UV/Vis, revealing that PCL-G3-PEG-Rho and PCL-G3-PEG-FA contained approximately 1 Rho and approximately 2 FA molecules per PDC, respectively.

Figure 7A:
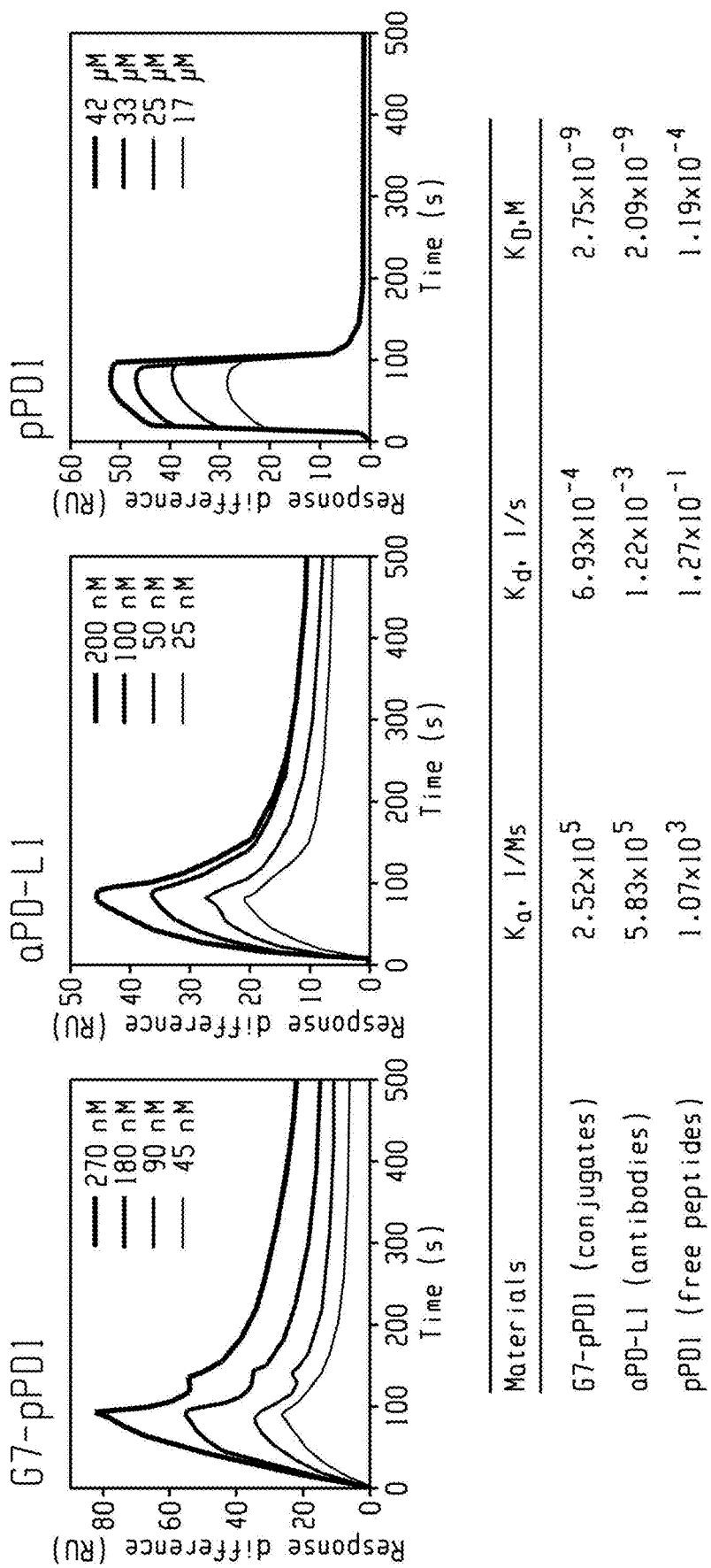
FIGS. 7A-C show various assay results comparing peptides and antibodies: 7A shows surface plasmon resonance (SPR) sensograms of dendrimer-pPD-1, free aPD-L1, and free pPD-1. The dendrimer-peptide conjugates exhibit comparable KD to the whole antibody (aPD-L1), which is 5 orders of magnitude stronger than free peptide. 7B shows the dendrimer-peptide conjugates exhibiting specific interaction with high PD-L1 expressing 7860 cells (bottom image). 7C shows PD-L1-expressing tumor accumulation in vivo of G7-pPD1 conjugates demonstrating higher and longer accumulation in the target tumor of the conjugates compared to free peptides (pPD-1)
Figure 7B:
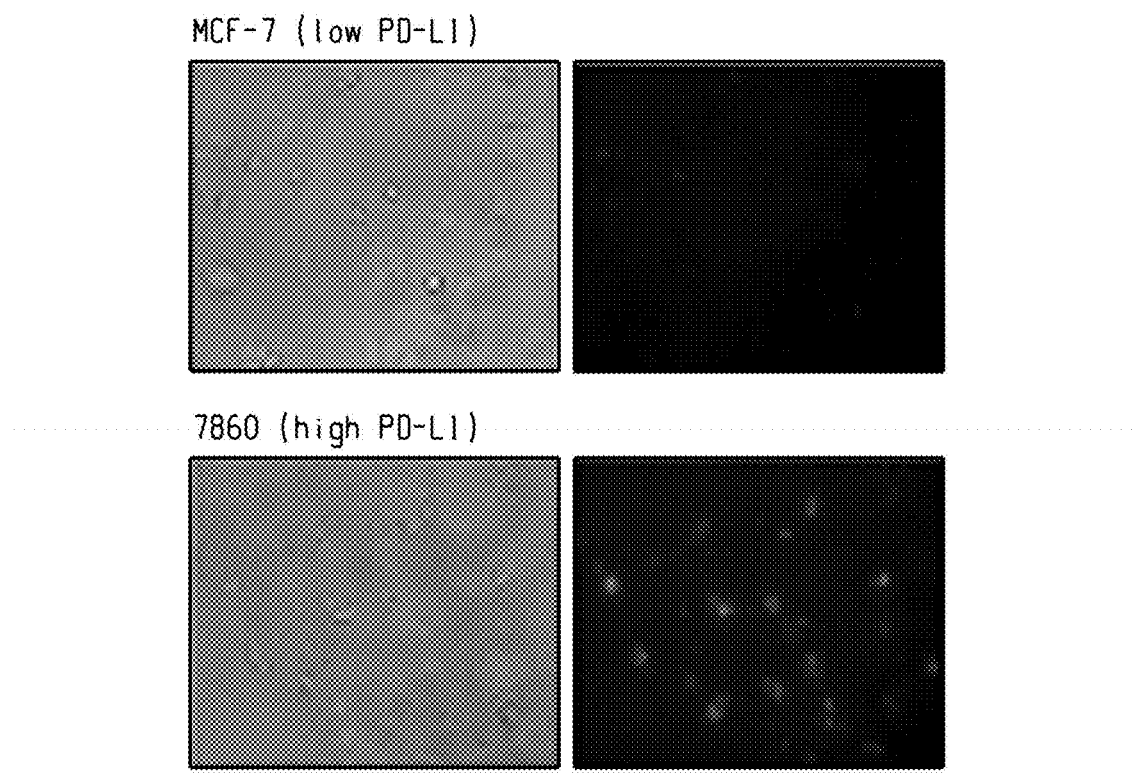
Figure 7C:
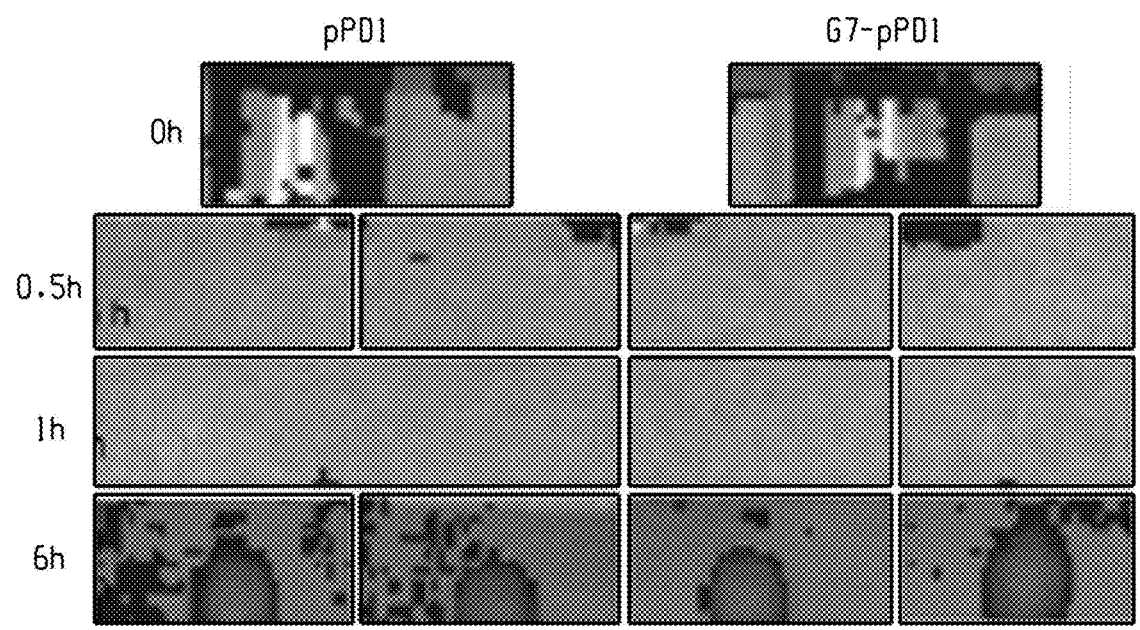

Peptides that bind to PD-L1, denoted pPD1 were synthesized. For the PD-L1-binding peptide (pPD-1), we used the following peptide sequence: HVVWHRESPSGQTDTLAA (SEQ ID NO: 5), optimized from the literature. A major challenge of using peptides is their inferior binding kinetics to their corresponding antibodies, despite the advantages stemming from their small MW and flexibility/capability to be better engineered. It was preliminarily tested if conjugation of the peptides to PAMAM dendrimers would significantly enhance their binding kinetics through multivalent binding effect. As shown by SPR (FIG. 7A), the dendrimer-peptide conjugates (G7-pPD1) achieved comparable $K_D$ to that of full antibody (aPD-L1), which is significantly stronger than free peptide (pPD1) by 5 orders of magnitude. The dendrimer-peptide conjugates (red fluorescence) also displayed a selective binding to PD-L1 expressing cells (7860), in contrast to the lack of observed interactions in MCF-7 cells with a low PD-L1 expression (FIG. 7B). The in vitro specificity was translated into selective accumulation and longer retention into PD-L1 expressing tumor in vivo (FIG. 7C).

Example 4

In Vivo Airway Monitoring

Figure 8C:
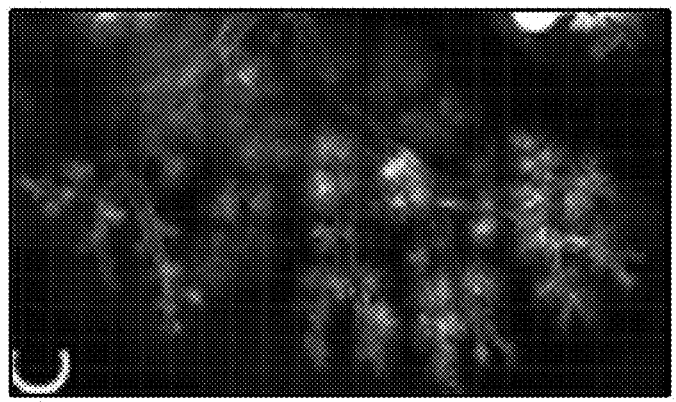
FIGS. 8A-C shows pulmonary nanoparticle distribution. Cy5-labeled DM were administered intranasally and imaged by IVIS ex vivo. 8A shows mock treated. 8B shows Cy5-DM treated. 8C shows 3D reconstruction through small airways. Nanoparticles persist for >24 h.
Figure 8A:

Dendrimer conjugation has been performed with fibronectin-binding peptides (FBP) and pulmonary distribution of the nanoparticles. An FBP sequence of CGTLQPVYQYMVGV (SEQ ID NO: 9) was synthesized, followed by conjugation with G7 PAMAM dendrimers labeled with Cy5. Both dendrimers (G7 with and without FBP) were fully acetylated to minimize any charged based non-specific interactions that are often observed in the case of unmodified, highly positively charged PAMAM dendrimers. The conjugates were then aerosolized and intranasally delivered to a mouse model. As shown in FIG. 8A,B, the nanoparticles accumulated into the airways and retained for over 24 h. High resolution 3D reconstruction indicated uptake of the DMs in the small airways (FIG. 8C).

Example 5

Figure 9:
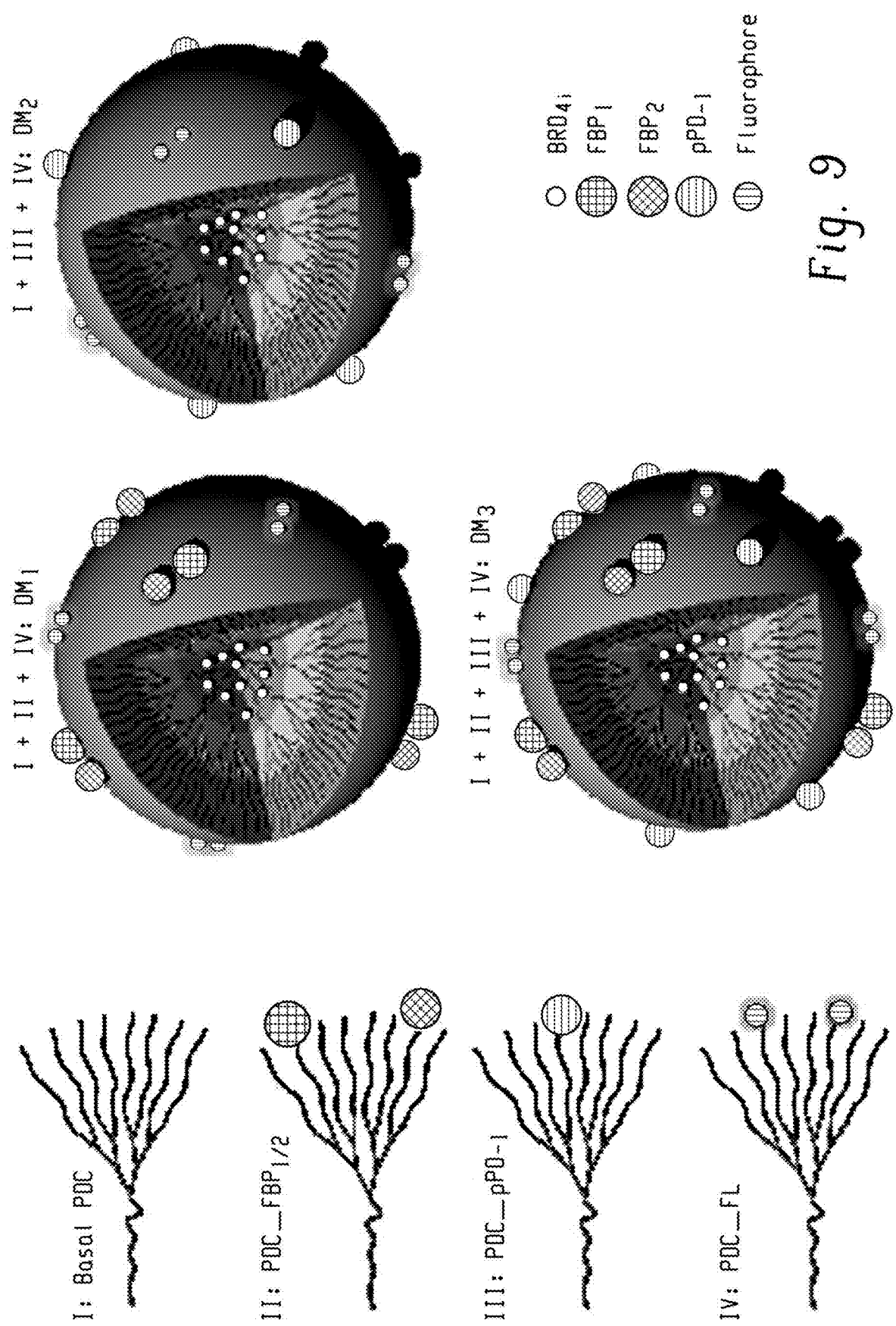
FIG. 9 shows a mix-and-match approach for preparation of a variety of multifunctional dendron micelles. DM1 (FN-targeting DM w/ BRD4i), DM2 (PD-L1-targeting DM w/ BRD4i), and DM3 (dual targeted DM w/ BRD4i) will be prepared and assessed.

Optimize Peptide-Functionalized PPD-1 DM Nanoparticles to Provide Selective and Long-Lived BRD4I Drug Delivery to PD-L1+ Cells Via Aerosol Administration A series of PDCs grouped with different functionalities will be synthesized, which will allow engineering of the final DMs through a mix-and-match approach. FIG. 9 illustrates exemplary PDCs.

Selection of MWs of each polymer component of PDCs: The molecular weight (MW) of each polymer block would largely affect the physical and biological properties of the resulting PDCs. We will start with PCL with 3.5 kDa, PEG with 2 kDa for II and 600 Da for I and III, and G3 dendron (870 Da). The MW of PEG is particularly important as the tethered configuration was found to be critical for maximal specific interaction between the targeting ligand on DMs and cell surface. Previous studies revealed that the DMs self-assembled from PEG2K tethered with targeting ligands and PEG0.6 K significantly amplified the specific interactions. The G3 polyester dendron will be chosen as it is large enough to provide multiple (eight) functional end groups and yet small enough to maintain the MWD at minimum. Depending on our initial results, the MWs will be varied to control release profiles and the HLBs.

Peptide synthesis: Two peptide sequences will be synthesized. For PD-L1 binding peptides (pPD-1), in addition to the human sequence (HVVWHRESPSGQTDTLAA SEQ ID NO: 5)), a mouse sequence: IYLCGAISLHPKAK-IEESPGA (SEQ ID NO: 6) will be also prepared for the subsequent in vivo mouse model studies. These peptides will be synthesized using 9-fluorenylmethoxycarbonyl (Fmoc)-based solid-phase synthesis technique and standard amino acid protecting groups on a Rink Amide MBHA resin LL. After the synthesis, peptides will be cleaved from the resin by 3 h treatment of a cleavage cocktail [trifluoroacetic acid (TFA)/triisopropylsilane (TIS)/water=95:2.5:2.5]. The mixtures will then be precipitated using tert-butyl methyl ether (TBME). The crude peptide solutions will be purified using reverse-phase HPLC with a $C_{18}$ semi-preparative column. HPLC conditions will be as follows: eluents (solvent A, water with 0.1% TFA; solvent B, acetonitrile with 0.1% TFA), flow rate (2 mL/min), and wavelength for UV detection (230 nm).

Molecular weights of the peptides will be confirmed by matrix-assisted laser desorption/ionization time-offlight mass spectrometry (MALDI-TOF MS), after co-crystallization with α-Cyano-4-hydroxycinnamic acid (CHCA) matrix. Their concentration will be determined by spectrophotometric measurement in water/acetonitrile (1:1) while using molar extinction coefficients of tryptophan (5690 $M_{-1}$ $cm_{-1}$) and tyrosine (1280 $M_{-1}$ $cm_{-1}$).

Figure 10:
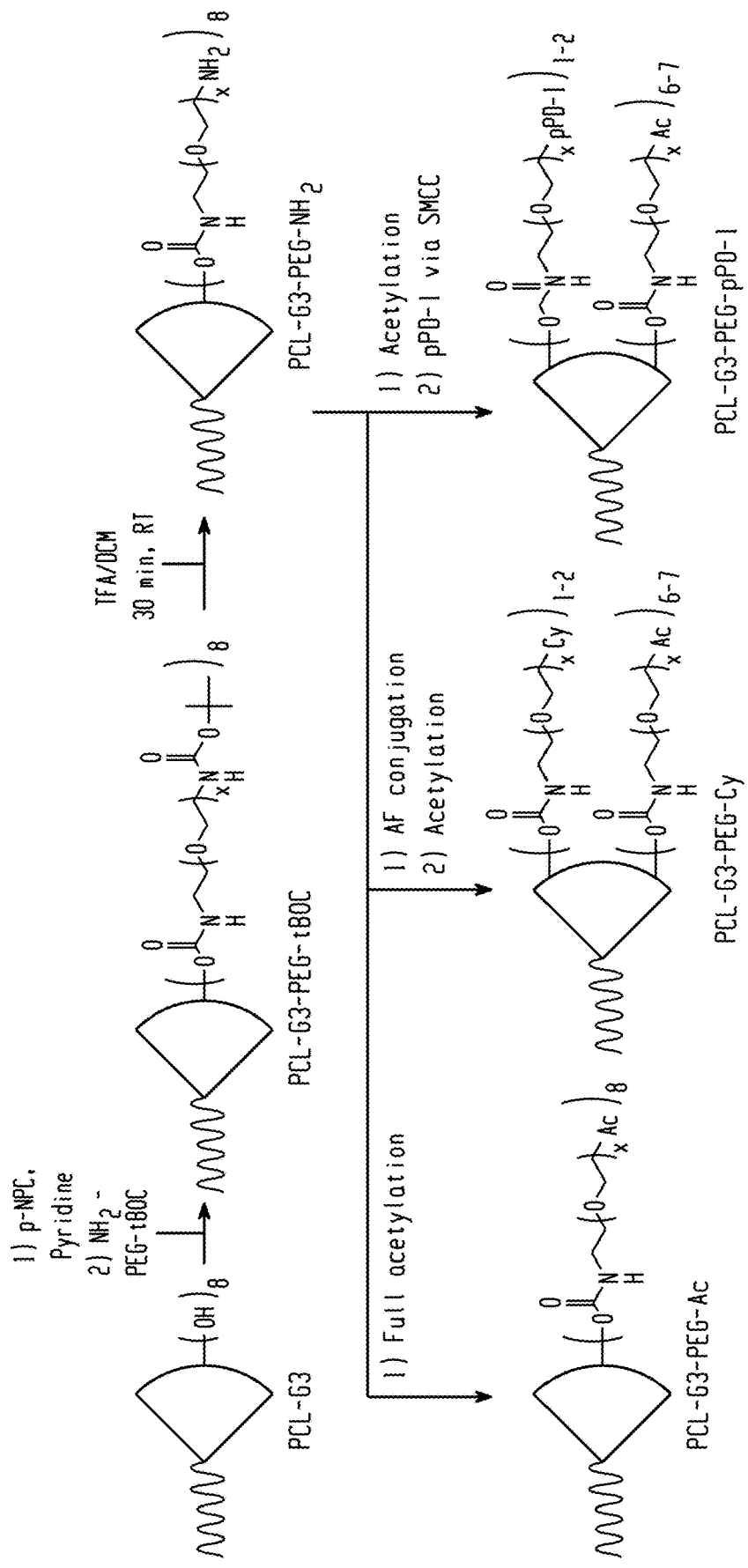
FIG. 10 shows synthetic routes of various PDCs functionalized with various bioactive molecules.

Conjugation of PDCs with functional agents: The synthetic routes of functionalized PDCs are illustrated in FIG. 10. Briefly, p-NPC activated PCL-G3 (MW 5,690 Da) will be conjugated with $NH_2$-PEG-tBOC, followed by deprotection with TFA, resulting in PCL-G3-PEG-$NH_2$. The amine groups will provide reactive sites for various bioactive agents such as the pPD-1 peptide and imaging agents Cy5.5 (Cy). Conjugation with the peptides and Cy will utilize chemistry known in the art. After all the conjugation reactions, the remaining amine groups will be acetylated to protect any potential non-specific interactions. The full acetylation is critical to achieve specific targeting without non-specific interactions. As a control group, linear block copolymers (PCL-PEGs) with the identical MWs with the PDCs will be also prepared to investigate the role of dendrons on the binding and biological behaviors.

DM formation encapsulating BRD4i through self-assembly: Various types of PDCs will be self-assembled into micelles, as illustrated in FIG. 9. For quantitative fluorescence analyses, the content of PCLG3- PEG-Cy5.5 (PDC_FL) will be fixed at 5%, and all other functional components will be mixed at various ratios from minimal (5%) to maximal (30%). For DMs without BRD4i, 20 mg of PDCs at various ratios will be dissolved in 2 mL of dimethylformamide (DMF). The solution will be dialyzed (MWCO 3.5K) against distilled water for 1 day and freeze dried for 2 days. For encapsulation of BRD4i, 20 mg of PDCs at the same various ratios will be dissolved in 4 mL of DMF along with 2-4 mg of BRD4i. The PDC-drug solutions will be then transferred to the dialysis membrane, dialyzed for 24 h against 2 L of distilled water, and freeze dried for 2 d to produce drug-loaded micelles. All the micelles will be characterized by morphology, size, and surface charge using AFM, TEM, and DLS. CMCs and encapsulation efficiency will be also measured.

Optimization of pPD-1 binding kinetics: The mixing ratio of PCL-G3-PEG-pPD-1 (PDC_pPD-1) per micelle will be optimized by binding kinetics measured by SPR using Biacore X (GE Healthcare), BLI, AFM (Asylum MFP-3D BiInfinity), according to methods known in the art. Briefly, PD-L1 will be immobilized on a substrate, and the binding behaviors of DMs containing various amount of PDC_pPD-1 (5-30% in total content) will be measured. The binding parameters ($k_a$, $k_d$, $K_A$, and $K_D$) will be quantitatively calculated to finalize an optimal ratio of PDC with the targeting peptides for a maximal multivalent binding.

Preparation of DMs for aerosol delivery. Distribution and release of nanoparticle encapsulated BRD4i (DM1) that bind to PD-L1 delivered by aerosol. As an example of the approach, Cy5- labeled DM were administered via intranasal inoculation. Cy5-DM were distributed throughout the airway, including terminal alveoli, and persisted for 24 h after administration, a distribution which could be seen in 3D reconstruction (FIG. 8C). All micelles will be aerosolized for pulmonary delivery. ADM loaded with BRD4i will be used, followed by aerosolization. Aerosolized pPD-1-functionalized DMs loaded with BRD4i and Cy5.5 will be administered to bleomycin treated mice. The composition of pPD-1-DM that shows the most selective binding and accumulation/retention will be optimized.

Expected Results. Preparation and characterization of PDCs and DMs: A large library of PDCs will be established after confirming the chemical structures of all PDCs prepared. PDCs within 10% deviation from theoretical MWs will be used and their MWDs will be maintained to be below 1.2. The strict threshold both in MWs and MWDs is expected to minimize the batch-to-batch variations and structural heterogeneity of PDCs. The fully functionalized DMs will have a size of approximately 50 nm in diameter, containing pPD-1 and Cy5.5 on the surface and at least 5 wt % of BRD4i in the core, along with >90% surface coverage by the PEG outer layers.

Number of functional groups: Based on our preliminary study, may be important to maintain the functional groups to be less than 3 molecules (peptides) per dendron, in order to maintain the structural regularity of the PDCs. Based on the understanding that the PD-L1+myofibroblasts are invasive and pro-fibrotic, it is predicted that the PD-L1 targeting DMs will substantially reduce the number of PD-L1 fibroblasts and fibrosis in the HCoV-NL63+bleomycin-treated groups, without affecting the total fibroblast number. It is predicted that the DM3 inhibitor will block both the epithelial transition and the total myofibroblast transition.

Example 6

Optimize Biodistribution and Evaluate Duration of BRD4 Inhibition by BRD4I-Encapsulated PPD-1 DMS The lung distribution of aerosolized pPD-1-functionalized DMs loaded with BRD4i and Cy5.5 (DM1) administered to bleomycin treated mice will be studied. 8 week old C57BL/6 mice will be treated with a single dose of bleomycin via the intratracheal route. 14 d after bleomycin administration, 8 aerosolized DM1 formulations will be administered via aerosol (InExpose, SCIREQ). Groups of mice will then be sacrificed after 1, 2 and 3d. Distribution of DM1 will be measured using whole lung optical IVIS imaging. The distribution of Cy5-DM will be imaged using IVIS, focusing on lower airway distribution using 3D reconstruction. In parallel, lungs will then be fixed, sectioned and immunostained with rabbit anti-COL1 antibody (Ab), or rabbit anti-FN1 Ab and mouse anti-CD274/ PD-L1 (1:200 dilutions, Abcam). The sections will be stained with secondary rabbit AF680 and anti-mouse AF 488 Abs. By varying the mixing ratios of individually functionalized PEGylated PDCs the composition of pPD-1 DM that shows the most selective binding and accumulation/retention will be optimized.

Evaluate pPD-1 DM binding fibrogenic foci in human IPF. Because the rodent models of interstitial fibrosis do not fully recapitulate the we will also probe the localization of pPD-1 DM to areas of fibrosis in intact human fibrotic lung tissue. To do so, we will use fresh, de-identified IPF lung tissue from biopsies or explanted lung transplants (available through an agreement with the University of Wisconsin Comprehensive Cancer Center under their IRB-approved protocol). Fresh, low melt temperature agarose infused IPF lung will be sectioned at 150 µM using a vibratome to create PCLs, which then are incubated in cell culture media and are viable for up to 72 hrs. PCLs will be incubated with various concentrations of pPDL-1 DM encapsulating Cy5. Sections will then be fixed and immunostained with rabbit anti-COL1 antibody (Ab), rabbit anti-FN1 Ab, or rabbit anti-αSMA, and mouse anti-CD274/ PD-L1 (1:200 dilutions, Abcam). The PCLs will then be stained with secondary rabbit AF680 and anti-mouse AF488 Abs. Adjacent sections will be processed for Masson-Trichrome staining.

Expected results: it is predicted that some preparations of pPD-1-DM will show enhanced retention in the small airway. The PCLs will be imaged to visualize distribution and or colocalization of Cy5.5 (pPD-1- DM), COL1, FN1, αSMA, and PD-L1. Colocalization is quantified using automated correlation analysis as we have used in previously. The algorithm first tests the significance of true colocalization over random color overlap and then quantifies the degree of colocalization by use of an automatic threshold search algorithm to avoid the bias of visual interpretation. Colocalization estimated using this technique has been validated by FRET. Colocalization of pDL-1 DM with COL1, FN1 and PD-L1, and enrichment of PD-L1 in regions associated with fibroblastic foci (αSMA+) is expected.

If PD-L1 targeting does not provide sufficient selectivity, the secondary peptides that bind fibronectin (FN1) will be employed. FN-binding peptides (FBPs; FBP I: TLQPVYEYMVGV (SEQ ID NO: 7) and FBP II: TGLPVGVGYVVTVLT (SEQ ID NO: 8)) have been synthesized.

Figure 8B:

Duration of release. Preliminary studies indicate that DMs can provide sustained release of drug over a prolonged period of time e.g., up to 7 d, and that intranasally administered DMs persist in the lungs for over 24 h in vivo (FIG. 8). These findings are consistent with other studies demonstrating prolonged release of salbutamol-loaded nanoparticles in the airway. To measure PK, a single dose of BRD4i-loaded pDL-1 DM nanoparticles will be administered to control- or bleomycin treated mice (14 d after bleomycin administration) via aerosol (n=5 animals/group). Lung and plasma will be initially collected at times=0, 6, 12, 24, and 36 h afterwards. The lungs will be homogenized, and BRD4i/ZL0591 abundance/unit volume will be measured using LCMS/MS using standard extraction methods. In brief, mouse lungs are homogenized in 1 ml of $H_2O$ with ceramic beads using a Precellys 24 homogenizer (Bertin Technologies). Protein is precipitated with 3 volumes of 100% acetonitrile (ACN) and cleared by centrifugation. The supernatants are then dried, reconstituted in ACN:$H_2O$ (10: 90 v/v) before being fractionated by $C_{18}$ reverse phase liquid chromatography (LC). The abundance of ZL0591 is determined by MS/MS using optimized ionization and collision energies in the MS2 scan using MaxLynx software, compared to calibration curves in untreated lung homogenate and plasma.

Expected results: To quantitate changes in drug concentration, $T_{1/2}$, AUC will be calculated on a Phoenix platform and WinNonlin analysis engine. LC peaks will be examined to determine whether new species appear, indicating tissue metabolism of the drug. A prolongation of the 11.8 h intravenous $T_{1/2}$ of ZL0591 in the lung tissue. Is predicted as is a substantial gradient of lung vs plasma ZL0591, a finding that would suggest preferential release of the drug locally in the lung tissue.

Duration of BRD4 inhibition. BRD4 activity can be directly measured. Empty or ZL-0591 loaded DM nanoparticles will be administered to control- or bleomycin treated mice via the intranasal route (n=5 animals/group). At times=0, 6, 12, 24, and 36 h afterwards (or using times modified by the results of the T112 study above), lung extracts and bronchoalveolar lavage fluid (BALF) will be prepared. Inhibition of BRD4 will be quantified.

In the lung homogenates, expression of BRD4 dependent processes will be quantified using highly specific parallel reaction monitoring (PRM) assays. In the lung homogenates, histone H3 (H3) Lysine (K) 122 Acetylation will be measured, a marker of BRD4 histone acetyltransferase activity whose abundance is reduced by BRD4 inhibition, and HEXIM1, a protein selectively upregulated by BRD4 inhibition and used as a biomarker of BRD4 antagonists.

In the BALF, abundance of BRD4-dependent biomarkers will be quantified in a systems-level pharmacoproteomics study in airway remodeling. These include 5 highly upregulated proteins ORM2, APCS, FgA/B, FN1 and SPARCL1).

Expected results: Precise quantification of H3K122Ac, HEXIM1, ORM2, APCS, FgA/B, FN1 and SPARCL1 is performed measuring unique proteotypic peptides and known amounts of "spike-in" standards. Stable isotopically labeled standards are resolved from the unlabeled sample using the high mass accuracy of the triple quadrapole mass spectrometer. Since SID standards behave identically in LC and MS ionization as the unlabeled peptide, we can determine the abundance of the target protein precisely.

A reduction of H3K122 Ac and upregulation of HEXIM1 are predicted as indicators of tissue BRD4 inhibition. Similarly, downregulation of the remodeling panel in BALF is predicted. Additionally, these studies will validate the use of ORM2, APCS, FgA/B, FN1 and SPARCL1 as potential markers of BRD4 effect in human intervention studies.

Example 7

Figure 11:
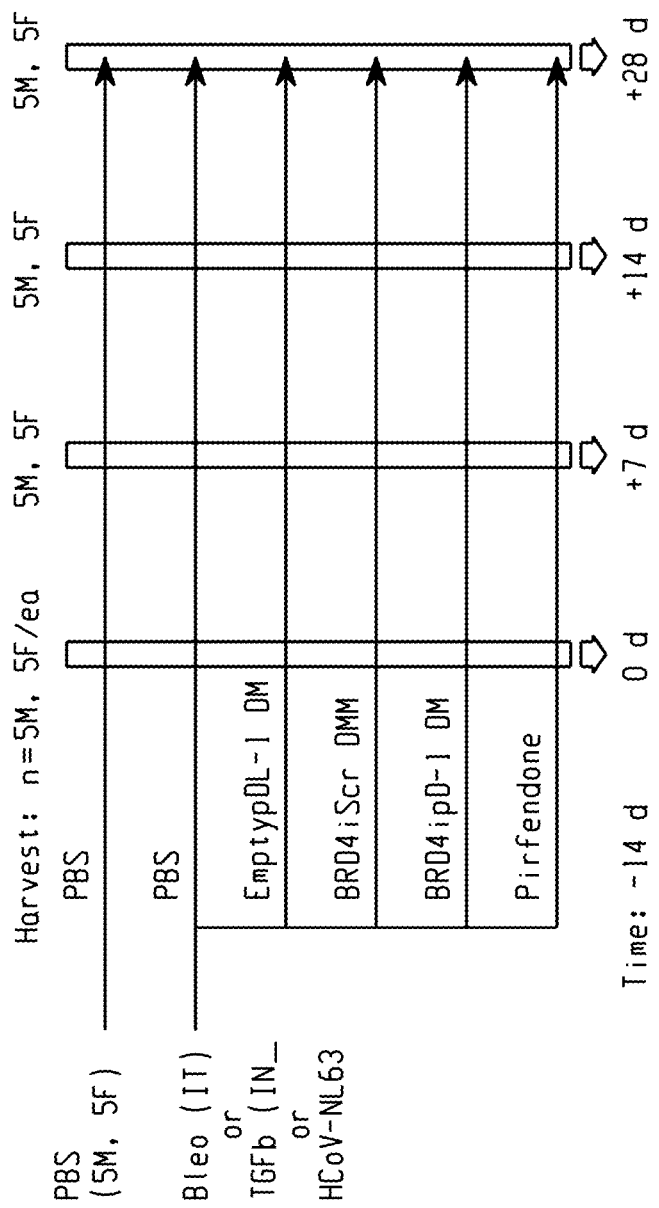
FIG. 11 shows efficacy in Bleo-induced fibrosis. Empty pPD-1-DMs or BRD4i-encapsulated scrambled or pPD-1-DMs will be administered to bleomycin treated C57BL/6 mice 14 d after Bleo treatment. Animals are harvested 0, 7, 14 and 28 d.
Figure 12:
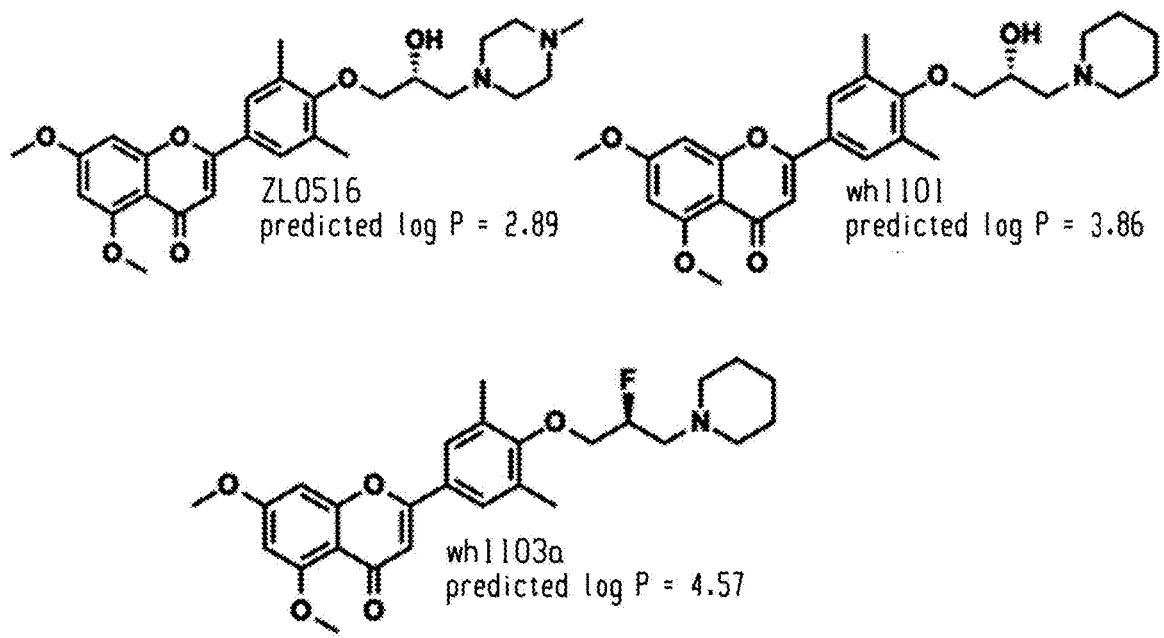
FIG. 12 shows BRD4 inhibitors and their hydrophobicities (log P).
Figure 13:
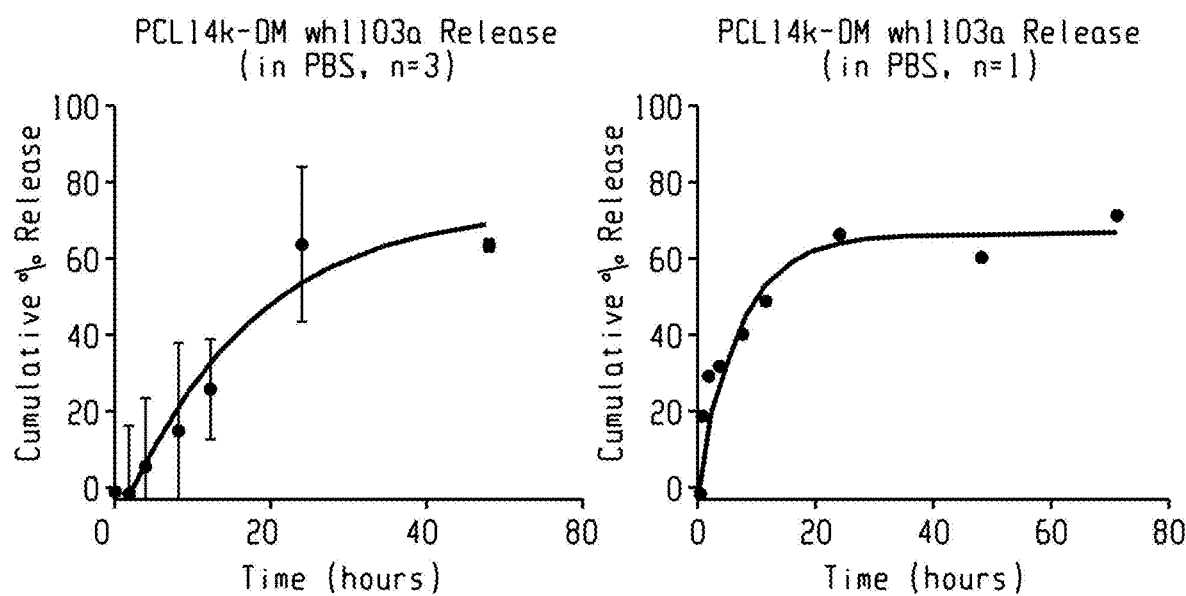
FIG. 13 shows drug release profile of 20% wt wh1103a-loaded PCL14k-DM in PBS (n=3) (left), and a single replicate from the left data (right).

Demonstrate Improved Efficacy of BRD4I-Encapsulated PPD-1 DM Nanoparticles in Models of IPF The efficacy of selected pPD-L1 DM will be determined in a mouse model of interstitial fibrosis. Recognizing that no single model is fully representative of human IPF, inhibitor efficacy will be tested in three paradigms: 1). bleomycin, an inducer of the UPR; 2). TGFβ-induced fibrosis, an activator of myofibroblasts; and, 3). COVID-induced inflammation/fibrosis.

Bleomycin-induced interstitial fibrosis. Bleomycin-induced fibrosis is produced by instilling a single intratracheal (IT) dose of bleomycin (1 U/kg) or normal saline, as non-injurious control, to 12 week-old wild type C57BL/6J mice. Fourteen days after bleomycin administration, a time at which lung fibrosis is well established, mice will be randomized into five groups: 1. PBS; 2. Empty pPD-1 DM; 3. BRD4i encapsulated scrambled peptide DM; 4). BRD4i-encapsulated pPD-1 DM, and 5). pirfenidone treatment (300 mg/kg administered by gavage). Mice treated with PBS will be control (FIG. 11). The frequency of pPD-1 DM aerosol treatment will be based on the duration of BRD4 inhibition. Treatment will be for 7, 14 and 28 days and a robust array of markers of the fibrotic response and resolution will be assessed: pulmonary function, imaging (micro-CT and novel OCT), interstitial fibrosis (histology, collagen content, biomarkers) as described below. The PD-L1+myofibroblast population will be assessed.

Pulmonary function. Passive compliance will be measured using pressure volume loops in the expiratory phase using applied pressure oscillations and volume steps. Tissue elastance to increasing concentrations of methacholine (delivered using an ultrasonic nebulizer at 0.5, 1.0, 2.5, 5.0 and 10.0 mg/ml by a computer-controlled ventilator (Flexi-Vent; SCIREQ®). Respiratory system input impedance is derived from the Low-Frequency Forced Oscillation Technique (LFOT), from which tissue damping (G) and elastance (H) are determined.

Collagen content. Total hydroxyproline will be measured in lung tissue using acid hydrolysis and chloramine T oxidation of acid hydrolysate and reacted with 4-(Dimethylamino) benzaldehyde (DMAB). The hydroxyproline abundance is determined by absorbance at 560 nm relative to hydroxyproline standards.

Histology. Changes in fibrosis will be measured using modified Ashcroft scoring of Masson's trichomestained sections by a veterinary pathologist the UW Research Animal Resources Center.

Biomarkers of BRD4-induced remodeling. BRD4 inhibitory effect will be measured by expression of HEXIM1 and ORM2/ APCS/FgA/B/FN1/ SPARCL1 using PRM measurements as above.

Micro-CT Imaging. Fibrosis is quantified by averaging density (in Hounsfield Units) in the left lung at T4 for comparison across animals.

Optical Coherence Tomography (OCT). OCT imaging provides a complementary cross-sectional evaluation of the lung mucosa with 3-10 μm resolution to quantify pathological collagen deposits.

PD-L1+myofibroblasts. Total PD-L1+myofibroblast populations will be quantified in lung homogenates using multiparametric Flow Cytometry for CD274+ and αSMA+ population.

Statistical analysis: Experiments will be repeated 3 times. As there are three factors (gender, Bleo administration, and therapeutic agent), we will analyze the data using a general linear model. If gender is found not to be significant, we will pool genders and use two-way analysis of variance (ANOVA) methods, which will increase the power and groups compared using post-hoc tests. Our primary endpoints will be hydroxyproline and lung density by microCT. We estimate that the power for a two-way ANVOA to detect a significant difference will be at least 85% with a significance level of 0.05 when there are 5 animals per group per gender. This is based on a 2-fold effect size on hydroxyproline a common standard deviation of 0.37.

TGFβ-induced interstitial fibrosis. We have established a model of TGFβ-induced airway fibrosis and demonstrated the central role of BRD4 in mediating TGFβ pathology. In this model, interstitial fibrosis, epithelial mesenchymal transition and myofibroblast expansion is dependent on BRD4. Mice will be given repetitive TGFβ1 (1 g/mouse intranasally) challenges every other day for a total of 15 treatments. Mice will be randomized into six groups (FIG. 11). Endpoints will include pulmonary function, imaging (micro-CT and novel OCT), interstitial fibrosis (histology, collagen content, biomarkers) described above and using the same Statistical analysis plan.

COVID-induced interstitial fibrosis. Presented earlier, COVID-19 infections in the elderly, smoking and in those with preexisting comorbidities results in ARDS and end organ failure. With an overall ~60% survival rate, those with COVID-19 ARDS will have residual reduction in pulmonary function and abnormalities that mimic interstitial lung disease, including circulating ECM components [hyaluronans, COL III, radiographic evidence of pulmonary scarring and functional defects in diffusion capacity are commonly seen.

Informed by our substantial published work on virus-induced airway remodeling, we know that RNA virus replication in lower airway cells induces elaboration of profibrotic TGF and expansion of the myofibroblast population. Also of relevance, we know that persistent coronavirus replication in STAT1- produces airway inflammation and remodeling characteristic of severe COVID-19. Here, we will evaluate the effect of human coronavirus (HCoV) strain NL63 (Amsterdam 1, BRC) infection. HCoV-NL63 stably circulates in the human population and is a cause of severe pulmonary infections and neurologic disease typical of SARS CoV2 infections. Like SARS CoV 2, the etiological agent of COVID, HCoV-NL63 binds to the human angiotensin converting enzyme ACE)-2 receptor and replicates in human airway epithelium. Importantly, HCoV-NL63 can be studied in BSL2 containment in permissive K18-hACE2-expressing transgenic mice (Jackson Laboratory).

In preliminary experiments, we will establish conditions for producing active HCoV-NL63 replication using K18-hACE2 in C57BL/6 background, using intranasal inoculation of infectious virus. We will establish a standard inoculum that maximally induces myofibroblast numbers first using escalating inoculum from 1×10₃ to 1×10₅ pfu/mouse. With this standardized model, we will conduct an experiment testing the role of pPD-1 DM on myofibroblast numbers and collagen formation (diagrammed in FIG. 11). Treatment will begin after the peak of viral replication, when myofibroblast numbers are maximal. Mock-infected mice will serve as control. For each DM preparation, infected mice will be randomly grouped into 6 groups: PBS, empty pPD-1 DM, BRD4i encapsulated scrambled DM, BRD4i-encapsulated pPD-1 DM, and pirfenidone. 5M and 5F will be sacrificed at time=0, peak of viral replication, and 4 d intervals for 3 sampling points thereafter. Mice will be imaged and sacrificed for lung function, histology, remodeling factor expression and myofibroblast determination.

Expected results: We anticipate that bleomycin and TGFβ will induce collagen deposition and lung density, our primary endpoints, as well as increase respiratory elastance, expression of BALF remodeling factors and myofibroblast numbers. Based on our preliminary demonstration of the effect of systemic ZL0591, we expect that airway delivery and sustained local release will have enhanced therapeutic effect. Similarly, based on our extensive experience with rodent models of paramyxovirus infection, we anticipate that the HCoV-NL63 infection model will enhance myofibroblast formation and expression of remodeling factors. A test of our hypothesis will be that these early features of remodeling will be reduced. Our experiments are designed to determine if BRD4i-encapsulated pDL-1 DM produces greater reversibility of airway fibrosis than the FDA approved therapeutic, pirfenidone.

Example 8

Dendron Micelles Loaded with BRD4 Inhibitors with Different Hydrophobicities Formation and drug loading of micelles was completed following two methods, dialysis and thin film hydration. Dialysis was completed by dissolving PEGylated dendron coil unimers in THF and stirring vigorously for 10 minutes. The unimers were then added dropwise to stirring water at a 1:1 solvent ratio and stirred for an additional 10 minutes before addition to a dialysis bag that was allowed to dialyze for 24 hours before lyophilization. Thin film hydration was completed by dissolving the unimers in ACN and rotating at 120 rpm on a rotary evaporator at 60C for 5 minutes with the vacuum off before turning on the vacuum for an additional 5 minutes. Upon thin film formation, room temperature water was added to result in a concentration of 1 mg/mL before being passed through a 0.2 um filter. We began with three different BRD4 inhibitors with different hydrophobicities. The inhibitors were ZL0516, wh1101, and wh1103a, with log P values of 2.89, 3.86, and 4.57, respectively (FIG. 12).

Experimentation began by forming micelles via dialysis for each of the BRD4 inhibitors. Inhibitor wh1103a demonstrated the best drug loading (Table 1), so it was chosen for the comparison of the two formation methodologies. Thin film hydration demonstrated significantly increased drug loading and encapsulation efficiency with wh1103a compared to dialysis (Table 1).

TABLE 1

DRUG LOADING AND ENCAPSULATION EFFICIENCY OF PCL14K-DMS WITH INITIAL LOADING OF 20% WT

| Drug | Formation Method | Drug Loading % | Encapsulation Efficiency % |
|---|---|---|---|
| ZL0516 | Dialysis | 0.70 ± 0.17 | 2.52 ± 0.17 |
| wh1101 | Dialysis | 2.90 ± 0.20 | 14.80 ± 0.90 |
| wh1103a | Dialysis | 3.20 ± 0.50 | 16.40 ± 1.20 |
| wh1103a | Thin film | 11.47 ± 4.28 | 49.96 ± 19.53 |

A drug release profile was generated for dendron micelles loaded with 20% wt wh1103a (FIG. 13). 1.5 mg of drug-loaded micelles were formed via thin film hydration and then combined with 1.5 mL 10 mM PBS pH 7.4 and added to a dialysis bag (MWCO 3.5 kDa). The bag was added to a beaker with 250 mL 10 mM PBS pH 7.4 at 37 C and stirring at 100 rpm. 100 μL samples of the bag interior were taken at 0, 0.5, 1, 2, 4, 8, 12, 24, 48, and 72 hours, with the external PBS media changed at predetermined timepoints to approximate sink conditions.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

What is claimed is:

1. A self-assembled therapeutic dendron-micelle, comprising
a first amphiphilic dendron-coil, a second amphiphilic dendron-coil, and optionally a third amphiphilic dendron-coil; and
an encapsulated BRD4 ligand or a pharmaceutically acceptable salt thereof, or an encapsulated BRD4 proteolysis targeting chimera comprising a formula BRD4 ligand-linker-ubiquitin ligase cereblon ligand, or a pharmaceutically acceptable salt thereof;
wherein the first amphiphilic dendron-coil comprises a first non-peptidyl, hydrophobic core-forming component covalently linked to a first polyester dendron which is covalently linked to first a poly(ethylene glycol) (PEG) moiety, wherein the first PEG moiety comprises a first conjugated therapeutic peptide;
wherein the second amphiphilic dendron-coil comprises a second non-peptidyl, hydrophobic core-forming component covalently linked to a second polyester dendron which is covalently linked to a second poly(ethylene glycol) (PEG) moiety, wherein the second PEG moiety does not comprise a conjugated peptide, and optionally a third amphiphilic dendron-coil, wherein the third amphiphilic dendron-coil comprises a third non-peptidyl, hydrophobic core-forming component covalently linked to a third polyester dendron which is covalently linked to a third poly(ethylene glycol) (PEG) moiety, wherein the third PEG moiety comprises a second therapeutic binding peptide, wherein the first and optional second therapeutic peptides each individually comprises an immune checkpoint receptor binding peptide which binds PD-L1, PD-1, OX40, TIGIT, CTLA-4, CD137 (4-1BB), CD28, or CD27; a fibronectin binding peptide; a peptide inhibitor based on the protease domain of angiotensin-converting enzyme 2 (ACE2); or a PDGFR beta-binding peptide.

2. The self-assembled therapeutic dendron-micelle of claim 1, further comprising a fourth amphiphilic dendron-coil comprising a fourth non-peptidyl, hydrophobic core-forming component covalently linked to a fourth polyester dendron which is covalently linked to a fourth poly(ethylene glycol) (PEG) moiety, wherein the fourth PEG moiety comprises a conjugated imaging contrast agent.

3. The self-assembled therapeutic dendron-micelle of claim 1, wherein the immune checkpoint receptor comprises PD-L1.

4. The self-assembled therapeutic dendron-micelle of claim 1, wherein the first, second and third non-peptidyl, hydrophobic core-forming components are selected from polycaprolactone (PCL), poly(lactic acid) (PLA), poly(glycolic acid) (PGA), and poly(lactic-co-glycolic acid) (PLGA), specifically poly (ε-caprolactone).

5. The self-assembled therapeutic dendron-micelle of claim 1, wherein the first, second and third non-peptidyl, hydrophobic core-forming components have a molecular weight of 0.5 kDa to about 20 kDa, wherein the molecular weights of the first, second and third non-peptidyl, hydrophobic core-forming components are the same or different.

6. The self-assembled therapeutic dendron-micelle of claim 1, wherein the first, second and third polyester dendrons comprise a generation 3 to generation 5 dendron with an acetylene or carboxylate core, specifically a generation 3 polyester-8-hydroxyl-1-acetylene bis-MPA dendron.

7. The self-assembled therapeutic dendron-micelle of claim 1, wherein the first, second and third PEG moiety independently comprise a methoxy PEG (mPEG) moiety, amine-terminated PEG (PEG-NH$_2$) moiety, acetylated PEG (PEG-Ac) moiety, carboxylated PEG (PEG-COOH) moiety, thiol-terminated PEG (PEG-SH) moiety, N-hydroxysuccinimide-activated PEG (PEG-NHS) moiety, NH$_2$-PEG-NH$_2$ moiety, or an NH$_2$-PEG-COOH moiety.

8. The self-assembled therapeutic dendron-micelle of claim 1, wherein the first, second and third PEG moiety each have a molecular weight of about 0.2 kDa to about 5 kDa.

9. The self-assembled therapeutic dendron-micelle of claim 1, further comprising an imaging agent, or radiosensitizing molecule.

10. The self-assembled therapeutic dendron-micelle of claim 1, wherein the BRD4 ligand comprises an azepine, a triazobenzene, a fused tetracycle, a quinoline, a quinazoline, an N-methylpyridinone, an N-methylpyridazinone, a triazolopyrazine, a triazolopyridazine, a triazolopyridine, a triazole, a pyrrole, or an isoxazole.

11. The self-assembled therapeutic dendron-micelle of claim 1, wherein the BRD4 ligand comprises a structure of Formula (IA), (IB), (IC), (ID), (IE), (IF), or a pharmaceutically acceptable salt thereof, and wherein:

the BRD4 ligand of Formula (IA) or pharmaceutically acceptable salt thereof has the structure

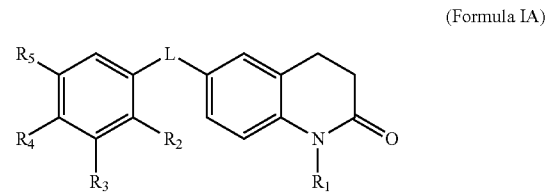

(Formula IA)

wherein

L is -N=N— or —NH(CO)NH—;

R$_1$ is H or C$_1$-C$_4$ alkyl or arylalkyl;

R$_2$, R$_3$, and R$_5$ are independently H, —OH, alkyl, alkoxy, halogen, —NH$_2$, or —CF$_3$;

R$_4$ is —OH, —NH$_2$, —CF$_3$, —(CH$_2$)$_n$R$_6$ where n is 1-4 and R$_6$ is —OH or —NH$_2$, —O(CH$_2$)$_m$R$_7$ where m is 1-4 and R$_7$ is —OH or —NH$_2$, or R$_4$ and R$_5$ are optionally joined to form a 5-6 membered heteroaryl having 1-3 heteroatoms;

the BRD4 ligand of Formula (IB) or pharmaceutically acceptable salt thereof has the structure

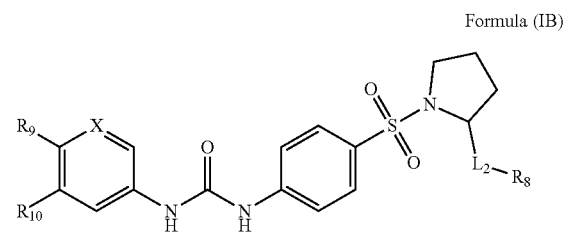

Formula (IB)

wherein

L$_2$ is —CH$_2$— or —(CO)NH—;

R$_2$ is H, —OH, alkyl, alkoxy, halogen, —NH$_2$, or —CF$_3$;

R$_8$ is —OH, —OTs, alkoxy, ester, substituted or unsubstituted aryl, or substituted or unsubstituted 3-7 member heterocycle, or —NR$_{18}$R$_{19}$ where R$_{18}$ and R$_{19}$ are independently H, alkyl; or R$_{18}$ and R$_{19}$ are optionally joined to form a 3-6 membered substituted or unsubstituted heterocycle having 1-3 heteroatoms;

X is C or N, wherein X can be at ring position 2, 3, 4, 5, or 6;

R$_9$ and Rio are independently from H, —OH, halogen, —CF$_3$, alkyl, hydroxylalkyl, amino, or alkylamino, or R$^9$ and R$^{10}$ are optionally joined to form a 5-6 membered heteroaryl or heterocycle having 1-3 heteroatoms and optionally substituted with one or more substituents from alkyl, acetyl, and carbonyl; or the BRD4 ligand of Formula (IC) or pharmaceutically acceptable salt thereof has the structure

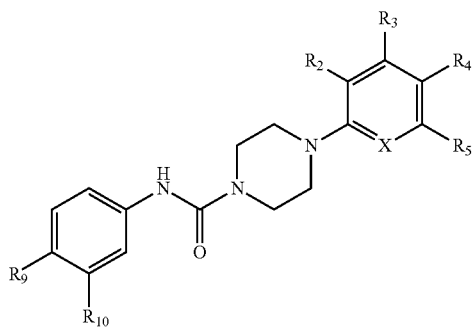

wherein
$R^2$, $R^3$, and $R^5$ are independently H, —OH, alkyl, alkoxy, halogen, —NH$_2$, or —CF$_3$;
$R^4$ is —OH, —NH$_2$, —CF$_3$, —(CH$_2$)$_n$R$^6$ where n is 1-4 and $R^6$ is —OH or —NH$_2$, —O(CH$_2$)$_m$R$^7$ where m is 1-4 and $R^7$ is —OH or —NH$_2$, or
$R^4$ and $R^5$ are optionally joined to form a 5-6 membered heteroaryl having 1-3 heteroatoms,
X is C, N, or O, wherein X can be at ring position 2, 3, 4, 5, or 6;
$R^9$ and $R^{10}$ are independently from H, —OH, halogen, —CF$_3$, alkyl, hydroxylalkyl, amino, or alkylamino,
or $R^9$ and $R^{10}$ are optionally joined to form a 5-6 membered heteroaryl or heterocycle having 1-3 heteroatoms and optionally substituted with one or more substituents from alkyl, acetyl, and carbonyl;
the BRD4 ligand of Formula (ID) or a pharmaceutically acceptable salt thereof has the structure Formula (ID)

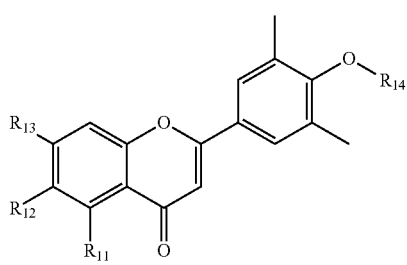

wherein R$_{11}$, R$_{12}$, and R$_{13}$ are independently H, —OH, halogen, alkoxy, —NH$_2$, —CF$_3$, —(CO)R$_{17}$ where R$_{17}$ is alkyl, alkoxy, amino, or alkylamino; R$_{14}$ is a C$_1$-C$_4$ alkyl substituted with one or more of: OH, halogen, alkoxy, amino, alkylamino, or an unsubstituted 5-6 membered heterocycle with 1-3 heteroatoms;
the BRD4 ligand of Formula (IE) or a pharmaceutically acceptable salt thereof has the structure (Formula IE)

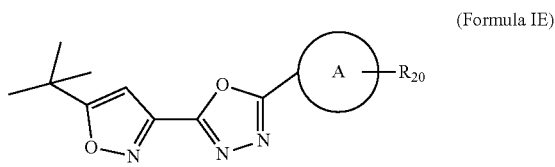

wherein A is a 5-6 membered, monocyclic or bicyclic heteroaryl with 1-3 heteroatoms, and A is unsubstituted or substituted with one or more substituents R$_{20}$ and R$_{20}$ is —OH, halogen, CF$_3$, NH$_2$, alkyl, heteroalkyl, alkoxy, or acetyl;
the BRD4 ligand of Formula (IF) or a pharmaceutically acceptable salt thereof has the structure Formula (IF)

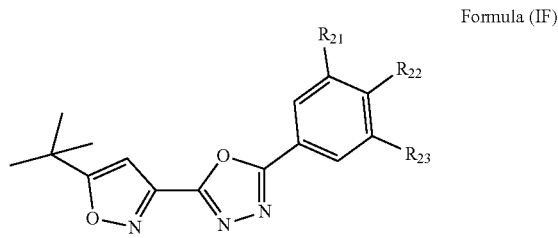

wherein R$_{21}$ and R$_{23}$ are independently selected from: —OH, halogen, CF$_3$, NH$_2$, alkyl, heteroalkyl, alkoxy, and acetyl; and R$_{22}$ is H, —OH, halogen, CF$_3$, NH$_2$, heteroalkyl, alkoxy, or acetyl.

12. The self-assembled therapeutic dendron-micelle of claim 1, wherein the linker comprises the structure of Formula (III) or a pharmaceutically acceptable salt thereof:

Formula (III)

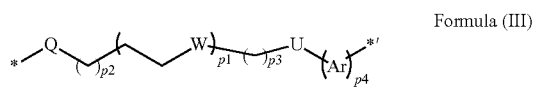

wherein p1 is an integer from 0 to 12; p2 is an integer from 0 to 12; p3 is an integer from 0 to 6; p4 is an integer from 0 to 2; each W is independently absent, CH$_2$, O, S, NH or NR$_{45}$; U is absent, CH$_2$, O, NH or NR$_{45}$; each R$_{45}$ is independently C$_1$-C$_3$ alkyl;
Q is absent, —C(O)NH—, —C(O)O—, —CH$_2$C(O)NH—, or —CH$_2$C(O)O-when p3 is an integer from 1 to 6; or Q is Q$_1$, -C$_1$-C$_4$ alkylene-Q$_2$, or Q$_1$-C$_1$-C$_4$ alkylene-Q$_2$ when p3 is an integer from 0 to 6, wherein each of Q$_1$ and Q$_2$ independently is C$_3$-C$_8$ cycloalkylene, 3- to 8-membered heterocycloalkylene, C$_6$-C$_{10}$ arylene, or 5- to 10-membered heteroarylene, each of which is optionally substituted with one or more of halogen, NH$_2$, CN, nitro, OH, C(O)OH, C$_1$-C$_6$ alkyl, C$_1$-C$_6$ haloalkyl, C$_1$-C$_6$ alkoxy, or C$_1$-C$_6$ haloalkoxy; each occurrence of Ar is C$_6$-C$_{10}$ arylene or 5- to 10-membered heteroarylene, * indicates a bond to the BRD4 ligand; and *' indicates a bond to the E3 ligase cereblon ligand.

13. The self-assembled therapeutic dendron-micelle of claim 1, wherein the ubiquitin ligase cereblon ligand comprises Formula (IIA) or (IIB), or a pharmaceutically acceptable salt thereof:

Formula (IIA)

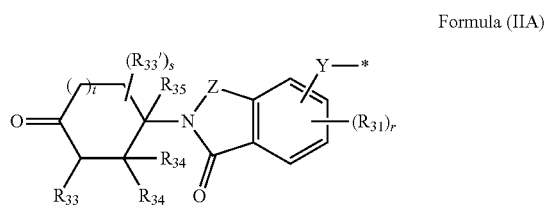

-continued

Formula (IIB)

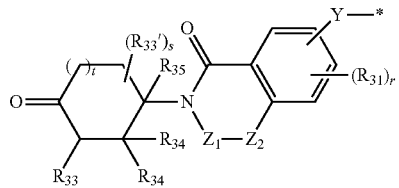

wherein

Y is a bond, $Y_1O$, NH, $NR_{32}$, C(O)O, C(O) $NR_{32'}$, Yi-O, Y NH, Y $NR_{32}$, $Y_1$—C(O), $Y_1$-C(O)O, $Y_1$—OC(O), $Y_1$—C(O) $NR_{32'}$, or Y—$NR_{32}$C(O), wherein Yi is $C_1$-$C_6$ alkylene, $C_2$-$C_6$ alkenylene, or $C_2$-$C_6$ alkynylene;

Z is C(O) or C $(R_{33})_2$;

$Z_1$-$Z_2$ is C $(R_{33})$=N or C $(R_{33})_2$—C$(R_{33})_2$;

each $R_{31}$ is independently halogen, nitro, $NH_2$, OH, C(O)OH, $C_1$-$C_6$ alkyl, or $C_1$-$C_6$ alkoxy; $R_{32}$ is $C_1$-$C_6$ alkyl, $C_2$-$C_6$ alkenyl, $C_3$-$C_8$ cycloalkyl, 3- to 8-membered heterocycloalkyl, C(O)-$C_1$-$C_6$ alkyl, C(O)-$C_2$-$C_6$ alkenyl, C(O)-$C_3$-$C_8$ cycloalkyl, or C(O)-3-to 8-membered heterocycloalkyl, and $R_{32}$ is optionally substituted with one or more of halogen, $N(R_a)_2$, NHC(O)$R_a$, NHC(O)O$R_a$, O$R_b$, $C_3$-$C_8$ cycloalkyl, 3- to 8-membered heterocycloalkyl, $C_6$-$C_{10}$ aryl, or 5- to 10-membered heteroaryl, wherein each of the $C_3$-$C_8$ cycloalkyl, 3- to 8-membered heterocycloalkyl, $C_6$-$C_{10}$ aryl or 5- to 10-membered heteroaryl is optionally further substituted with one or more of halogen, $NH_2$, CN, nitro, OH, C(O)OH, $C_1$-$C_6$ alkyl, $C_1$-$C_6$ haloalkyl, $C_1$-$C_6$ alkoxy, or $C_1$-$C_6$ haloalkoxy;

$R_{32'}$ is H, $C_1$-$C_6$ alkyl, $C_2$-$C_6$ alkenyl, $C_3$-$C_8$ cycloalkyl, or 3- to 8-membered heterocycloalkyl, and $R_{32'}$, when not being H, is optionally substituted with one or more of halogen, $N(R_a)_2$, NHC(O)$R_a$, NHC(O)O$R_a$, O$R_b$, $C_3$-$C_8$ cycloalkyl, 3- to 8-membered heterocycloalkyl, $C_6$-$C_{10}$ aryl, or 5- to 10-membered heteroaryl, wherein each of the $C_3$-$C_8$ cycloalkyl, 3- to 8-membered heterocycloalkyl, $C_6$-$C_{10}$ aryl or 5- to 10-membered heteroaryl is optionally further substituted with one or more of halogen, $NH_2$, CN, nitro, OH, C(O)OH, $C_1$-$C_6$ alkyl, $C_1$-$C_6$ haloalkyl, $C_1$-$C_6$ alkoxy, or $C_1$-$C_6$ haloalkoxy;

each $R_{33}$ is independently H or $C_1$-$C_3$ alkyl optionally substituted with $C_6$-$C_{10}$ aryl or 5- to 10-membered heteroaryl;

each $R_{33'}$ is independently $C_1$-$C_3$ alkyl;

each $R_{34}$ is independently H or $C_1$-$C_3$ alkyl; or two $R_{34}$, together with the carbon atom to which they are attached, form C(O), a $C_3$-$C_6$ carbocycle, or a 4-, 5-, or 6-membered heterocycle comprising 1 or 2 heteroatoms from N and O;

$R_5$ is H, $C_1$-$C_3$ alkyl, F, or Cl;

each $R_a$ independently is H or $C_1$-$C_6$ alkyl;

$R_b$ is H or tosyl;

t is 0 or 1;

r is 0, 1, 2 or 3;

s is 0, 1 or 2; and

* indicates a bond to the linker.

14. The self-assembled therapeutic dendron-micelle of claim 1, wherein the encapsulated BRD4 ligand comprises a compound represented by one of the following structures

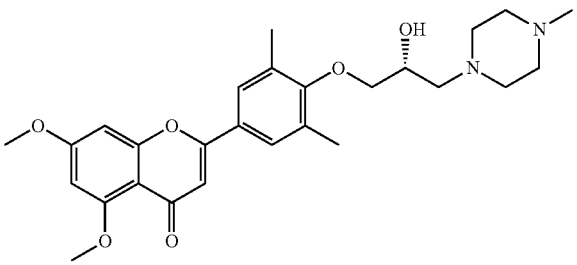

1D-1

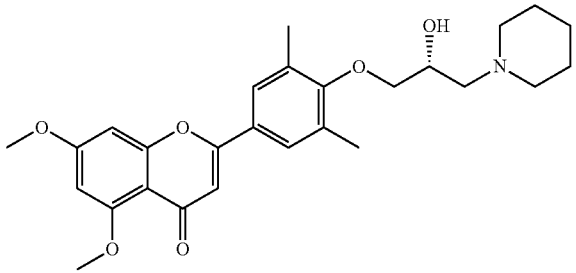

1D-2

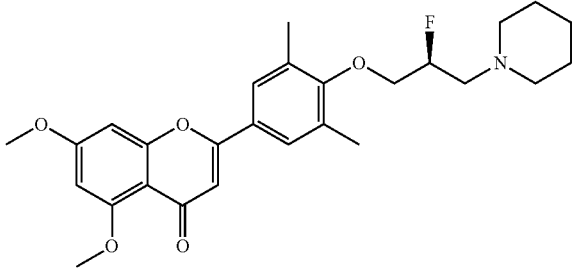

1D-3 the encapsulated BRD4 proteolysis targeting chimera comprises one of the following formulas

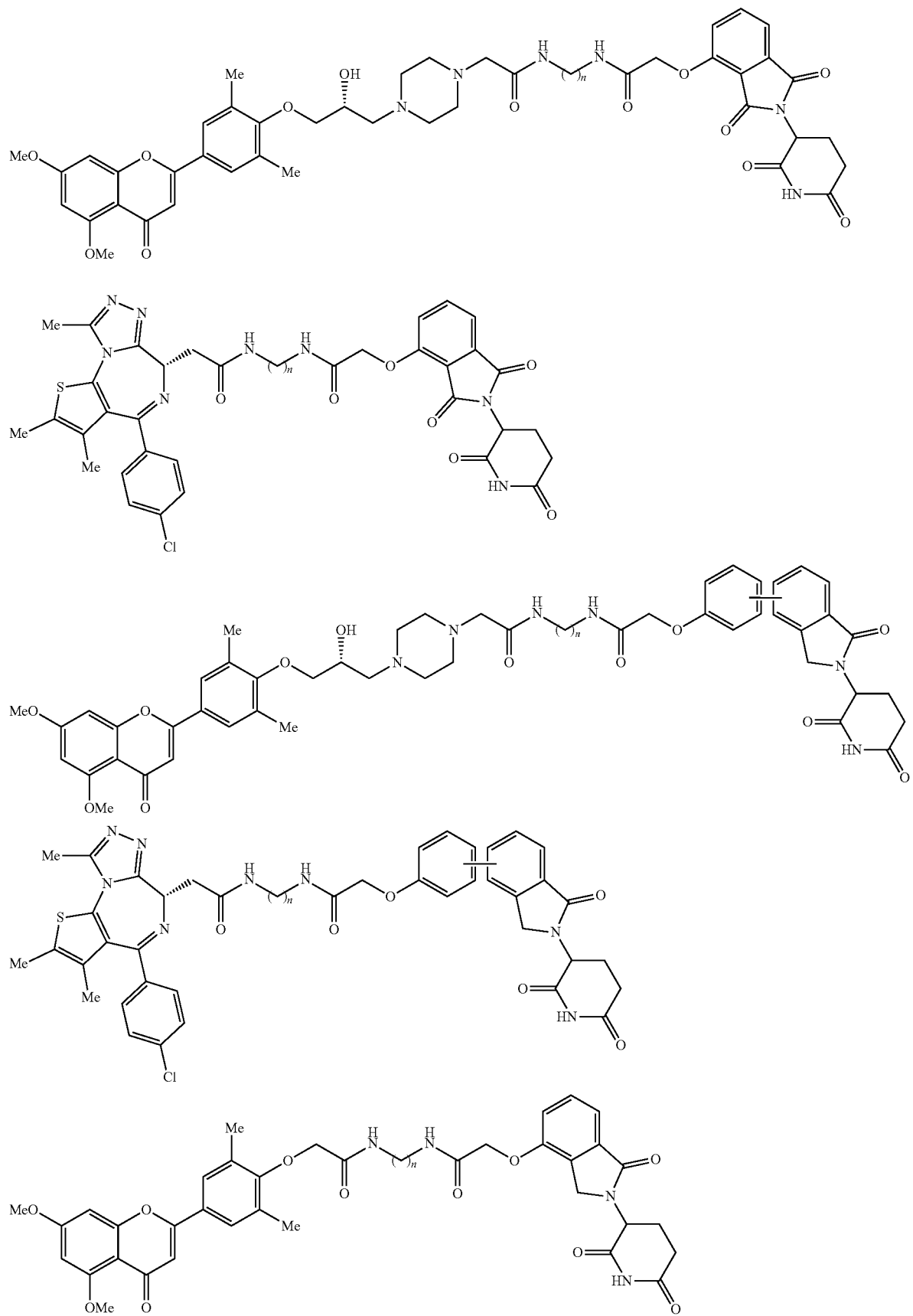

-continued
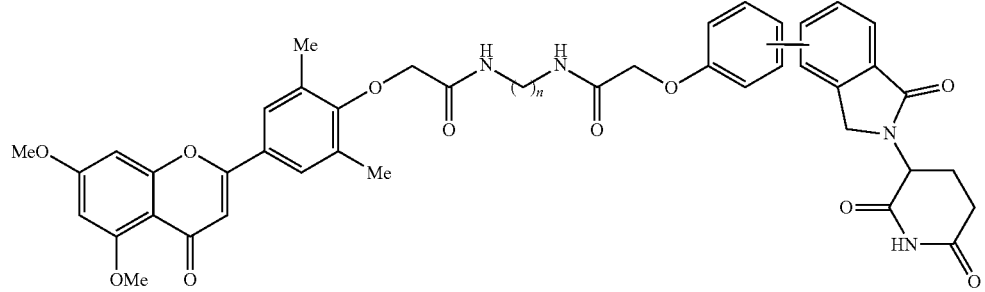
wherein n is an integer from 2 to 10.
15. A pharmaceutical composition comprising the self-assembled therapeutic dendron-micelle of claim 1 and a pharmaceutically acceptable excipient.
16. The pharmaceutical composition of claim 15, in the form of a composition for oral inhalation.
* * * * *

```
                              SEQUENCE LISTING

<160> NUMBER OF SEQ ID NOS: 17

<210> SEQ ID NO 1
<211> LENGTH: 21
<212> TYPE: PRT
<213> ORGANISM: Artificial Sequence
<220> FEATURE:
<223> OTHER INFORMATION: B-hairpin PD-1 peptide

<400> SEQUENCE: 1

Thr Tyr Leu Cys Gly Ala Ile Ser Leu Ala Pro Lys Leu Gln Ile Lys
1               5                   10                  15

Glu Ser Leu Arg Ala
            20

<210> SEQ ID NO 2
<211> LENGTH: 21
<212> TYPE: PRT
<213> ORGANISM: Artificial Sequence
<220> FEATURE:
<223> OTHER INFORMATION: B-hairpin PD-1 peptide

<400> SEQUENCE: 2

Thr Tyr Val Cys Gly Val Ile Ser Leu Ala Pro Arg Ile Gln Ile Lys
1               5                   10                  15

Glu Ser Leu Arg Ala
            20

<210> SEQ ID NO 3
<211> LENGTH: 18
<212> TYPE: PRT
<213> ORGANISM: Artificial Sequence
<220> FEATURE:
<223> OTHER INFORMATION: B-hairpin PD-1 peptide

<400> SEQUENCE: 3

Val Leu Asn Trp Tyr Arg Met Ser Pro Ser Asn Gln Thr Asp Arg Lys
1               5                   10                  15

Ala Ala

<210> SEQ ID NO 4
<211> LENGTH: 18
<212> TYPE: PRT
<213> ORGANISM: Artificial Sequence
<220> FEATURE:
<223> OTHER INFORMATION: B-hairpin PD-1 peptide

<400> SEQUENCE: 4

His Val Val Trp His Arg Glu Ser Pro Ser Gly Gln Thr Asp Thr Lys
1               5                   10                  15

Ala Ala

<210> SEQ ID NO 5
<211> LENGTH: 18
<212> TYPE: PRT
<213> ORGANISM: Homo sapiens

<400> SEQUENCE: 5

His Val Val Trp His Arg Glu Ser Pro Ser Gly Gln Thr Asp Thr Leu
1               5                   10                  15
```

Ala Ala

<210> SEQ ID NO 6
<211> LENGTH: 21
<212> TYPE: PRT
<213> ORGANISM: Mus musculus

<400> SEQUENCE: 6

Ile Tyr Leu Cys Gly Ala Ile Ser Leu His Pro Lys Ala Lys Ile Glu
1               5                   10                  15

Glu Ser Pro Gly Ala
            20

<210> SEQ ID NO 7
<211> LENGTH: 12
<212> TYPE: PRT
<213> ORGANISM: Artificial Sequence
<220> FEATURE:
<223> OTHER INFORMATION: FBP I binding peptide

<400> SEQUENCE: 7

Thr Leu Gln Pro Val Tyr Glu Tyr Met Val Gly Val
1               5                   10

<210> SEQ ID NO 8
<211> LENGTH: 15
<212> TYPE: PRT
<213> ORGANISM: Artificial Sequence
<220> FEATURE:
<223> OTHER INFORMATION: FBP II binding peptide

<400> SEQUENCE: 8

Thr Gly Leu Pro Val Gly Val Gly Tyr Val Val Thr Val Leu Thr
1               5                   10                  15

<210> SEQ ID NO 9
<211> LENGTH: 14
<212> TYPE: PRT
<213> ORGANISM: Artificial Sequence
<220> FEATURE:
<223> OTHER INFORMATION: FBP sequence

<400> SEQUENCE: 9

Cys Gly Thr Leu Gln Pro Val Tyr Gln Tyr Met Val Gly Val
1               5                   10

<210> SEQ ID NO 10
<211> LENGTH: 34
<212> TYPE: PRT
<213> ORGANISM: Artificial Sequence
<220> FEATURE:
<223> OTHER INFORMATION: ACE2 peptide

<400> SEQUENCE: 10

Glu Glu Gln Ala Lys Thr Phe Leu Asp Lys Phe Asn His Glu Ala Glu
1               5                   10                  15

Asp Leu Phe Tyr Gln Ser Ser Leu Ala Ser Trp Asn Tyr Asn Thr Asn
            20                  25                  30

Ile Thr

<210> SEQ ID NO 11
<211> LENGTH: 68
<212> TYPE: PRT
<213> ORGANISM: Artificial Sequence
<220> FEATURE:
<223> OTHER INFORMATION: ACE2 peptide

<400> SEQUENCE: 11

Ile Glu Glu Gln Ala Lys Thr Phe Leu Asp Lys Phe Asn His Glu Ala
1               5                   10                  15

Glu Asp Leu Phe Tyr Gln Ser Ser Leu Ala Ser Trp Asn Tyr Asn Thr
            20                  25                  30

Asn Ile Thr Glu Glu Asn Val Gln Asn Met Asn Asn Ala Gly Asp Lys
        35                  40                  45

Trp Ser Ala Phe Leu Lys Glu Gln Ser Thr Leu Ala Gln Met Tyr Pro
50                  55                  60

Leu Gln Glu Ile
65

<210> SEQ ID NO 12
<211> LENGTH: 9
<212> TYPE: PRT
<213> ORGANISM: Artificial Sequence
<220> FEATURE:
<223> OTHER INFORMATION: ACE2 peptide

<400> SEQUENCE: 12

Trp Asp Leu Gly Lys Gly Asp Phe Arg
1               5

<210> SEQ ID NO 13
<211> LENGTH: 85
<212> TYPE: PRT
<213> ORGANISM: Artificial Sequence
<220> FEATURE:
<223> OTHER INFORMATION: ACE2 peptide

<400> SEQUENCE: 13

Ile Glu Glu Gln Ala Lys Thr Phe Leu Asp Lys Phe Asn His Glu Ala
1               5                   10                  15

Glu Asp Leu Phe Tyr Gln Ser Ser Leu Ala Ser Trp Asn Tyr Asn Thr
            20                  25                  30

Asn Ile Thr Glu Glu Asn Val Gln Asn Met Asn Asn Ala Gly Asp Lys
        35                  40                  45

Trp Ser Ala Phe Leu Lys Glu Gln Ser Thr Leu Ala Gln Met Tyr Pro
50                  55                  60

Leu Gln Glu Ile Gln Ala Leu Thr Val Lys Leu Gln Leu Gln Ala Leu
65                  70                  75                  80

Gln Gln Asn Gly Ser
            85

<210> SEQ ID NO 14
<211> LENGTH: 40
<212> TYPE: PRT
<213> ORGANISM: Artificial Sequence
<220> FEATURE:
<223> OTHER INFORMATION: ACE2 peptide

<400> SEQUENCE: 14

Met Thr Gln Gly Phe Trp Glu Asn Ser Met Leu Thr Asp Pro Gly Asn
1               5                   10                  15

Val Gln Lys Ala Val Cys His Pro Thr Ala Trp Asp Leu Gly Lys Gly
            20                  25                  30

Asp Phe Arg Ile Leu Met Cys Thr
        35                  40

```
<210> SEQ ID NO 15
<211> LENGTH: 75
<212> TYPE: PRT
<213> ORGANISM: Artificial Sequence
<220> FEATURE:
<223> OTHER INFORMATION: ACE2 peptide

<400> SEQUENCE: 15

Ile Glu Glu Gln Ala Lys Thr Phe Leu Asp Lys Phe Asn His Glu Ala
1               5                  10                  15

Glu Asp Leu Phe Tyr Gln Ser Ser Leu Ala Ser Trp Asn Tyr Asn Thr
                20                  25                  30

Asn Ile Thr Glu Glu Asn Val Gln Asn Met Asn Asn Ala Gly Asp Lys
            35                  40                  45

Trp Ser Ala Phe Leu Lys Glu Gln Ser Thr Leu Ala Gln Met Tyr Pro
        50                  55                  60

Leu Gln Glu Ile Gln Ala Leu Thr Val Lys Leu
65                  70                  75

<210> SEQ ID NO 16
<211> LENGTH: 66
<212> TYPE: PRT
<213> ORGANISM: Artificial Sequence
<220> FEATURE:
<223> OTHER INFORMATION: ACE2 peptide

<400> SEQUENCE: 16

Asp Pro Gly Asn Val Gln Lys Ala Val Cys His Pro Thr Ala Trp Asp
1               5                  10                  15

Leu Gly Lys Gly Asp Phe Arg Ile Leu Met Cys Thr Lys Val Thr Met
                20                  25                  30

Asp Asp Phe Leu Thr Ala His His Glu Met Gly His Ile Gln Tyr Asp
            35                  40                  45

Met Ala Tyr Ala Ala Gln Pro Phe Leu Leu Arg Asn Gly Ala Asn Glu
        50                  55                  60

Gly Phe
65

<210> SEQ ID NO 17
<211> LENGTH: 13
<212> TYPE: PRT
<213> ORGANISM: Artificial Sequence
<220> FEATURE:
<223> OTHER INFORMATION: PDGFRbeta-binding peptide

<400> SEQUENCE: 17

Ile Pro Leu Pro Pro Pro Ser Arg Pro Phe Phe Lys Tyr
1               5                  10
```